United States Patent
Shao et al.

(10) Patent No.: US 12,393,638 B2
(45) Date of Patent: Aug. 19, 2025

(54) DYNAMICALLY DETECTING USER PERSONAS OF NETWORK USERS FOR CUSTOMIZED SUGGESTIONS

(71) Applicant: Cisco Technology, Inc., San Jose, CA (US)

(72) Inventors: Qihong Shao, Clyde Hill, WA (US); Josh Viktorov, Needham, MA (US); Doosan Jung, Lakewood, CO (US); Gurvinder Singh, San Jose, CA (US); Matthew R. Engle, Plano, TX (US); David C. White, Jr., St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 18/780,685

(22) Filed: Jul. 23, 2024

(65) Prior Publication Data

US 2024/0378253 A1    Nov. 14, 2024

Related U.S. Application Data

(63) Continuation of application No. 18/155,498, filed on Jan. 17, 2023, now Pat. No. 12,118,049.

(51) Int. Cl.
*G06F 16/9535* (2019.01)
*G06F 16/906* (2019.01)
*G06N 5/022* (2023.01)

(52) U.S. Cl.
CPC ........ *G06F 16/9535* (2019.01); *G06F 16/906* (2019.01); *G06N 5/022* (2013.01)

(58) Field of Classification Search
CPC .... G06F 16/9535; G06F 16/906; G06N 5/022
USPC .......................................... 707/738
See application file for complete search history.

(56) References Cited

U.S. PATENT DOCUMENTS

| | | | |
|---|---|---|---|
| 7,613,692 B2 * | 11/2009 | Hamilton | G06F 16/9535 |
| 8,145,512 B1 * | 3/2012 | Henne | G06Q 30/0201 |
| | | | 705/7.11 |
| 9,185,095 B1 * | 11/2015 | Moritz | H04L 63/0861 |
| 10,853,424 B1 * | 12/2020 | Mandaviya | G06N 7/01 |
| 11,842,204 B2 * | 12/2023 | Ben-Elazar | G06N 3/08 |

(Continued)

OTHER PUBLICATIONS

Kher, Priya, "Using Application Generated Data to Provide Personalized User Experience in Software Application", Master of Science Thesis in Engineering and Management, Massachusetts Institute of Technology, Boston, MA, Jun. 2018, 34 pages.*

(Continued)

*Primary Examiner* — Robert Stevens
(74) *Attorney, Agent, or Firm* — Edell, Shapiro & Finnan, LLC

(57) ABSTRACT

A platform dynamically detects a user persona and facilitates a user objective in a user session. The platform obtains user activity of users across multiple historical sessions. The platform clusters similar user activity across the historical sessions to determine personas being used in the historical sessions. The platform mines sequential patterns in a set of user activity data associated with one of the personas and determines at least one predictive rule associated with that persona. Each predictive rule includes an initial activity among the set of user activity data and at least one subsequent activity in the set of user activity data.

20 Claims, 17 Drawing Sheets

(56) References Cited

U.S. PATENT DOCUMENTS

| | | | |
|---|---|---|---|
| 11,908,003 B2* | 2/2024 | Price | G06N 3/08 |
| 2014/0379729 A1 | 12/2014 | Savage et al. | |
| 2016/0092769 A1 | 3/2016 | Lucey et al. | |
| 2017/0286845 A1 | 10/2017 | Gifford et al. | |
| 2018/0032318 A1 | 2/2018 | Satagopan et al. | |
| 2018/0248976 A1 | 8/2018 | Gibson et al. | |
| 2019/0103102 A1* | 4/2019 | Tseretopoulos | G06Q 50/01 |
| 2019/0139063 A1 | 5/2019 | Lamm et al. | |
| 2020/0084280 A1* | 3/2020 | Malhotra | G06F 11/3006 |
| 2020/0125921 A1 | 4/2020 | Manico et al. | |
| 2020/0372075 A1 | 11/2020 | Rogynskyy et al. | |
| 2021/0056458 A1* | 2/2021 | Savova | G06N 20/00 |
| 2021/0350202 A1 | 11/2021 | Zachariah et al. | |
| 2022/0284340 A1 | 9/2022 | Choudhary et al. | |
| 2022/0400129 A1* | 12/2022 | Kapoor | G06F 16/9537 |
| 2023/0245174 A1* | 8/2023 | Rajasekaran | G06Q 30/0631 705/14.66 |
| 2024/0086726 A1 | 3/2024 | Bar-Yam et al. | |

OTHER PUBLICATIONS

Arian A., et al., "Personas: A Market Segmentation Approach for Transportation Behavior Change", Transportation Research Record, vol. 2675, No. 11, National Academy of Sciences: Transportation Research Record Board, Jul. 2021, pp. 172-185.

Banerjee, A., et al, Article, "Clickstream Clustering using Weighted Longest Common Subsequence," https://www.researchgate.net publication/2365525_Clickstream_Clustering_using_Weighted_Longest_Common_Subsequences, Aug. 2001, 9 pages.

Bourobou, S.T.M., et al., "User Activity Recognition in Smart Homes Using Pattern Clustering Applied to Temporal ANN Algorithm", Sensors, vol. 15, No. 5, May 2015, pp. 11953-11971.

Jiang S., et al., "Clustering Daily Patterns of Human Activities in the City", Data Mining and Knowledge Discovery, vol. 25, Nov. 2012, pp. 478-510.

Shou Z., et al., "Similarity Analysis of Frequent Sequential Activity Pattern Mining", Transportation Research Part C, Emerging Technologies, vol. 96, Nov. 2018, pp. 122-143.

Wang, G. et al, Mining Human Behaviors, "Unsupervised Clickstream Clustering for User Behavior Analysis," https://dl.acm.org/doi/10.1145/2858036.2858107, May 7, 2016, 12 pages.

* cited by examiner

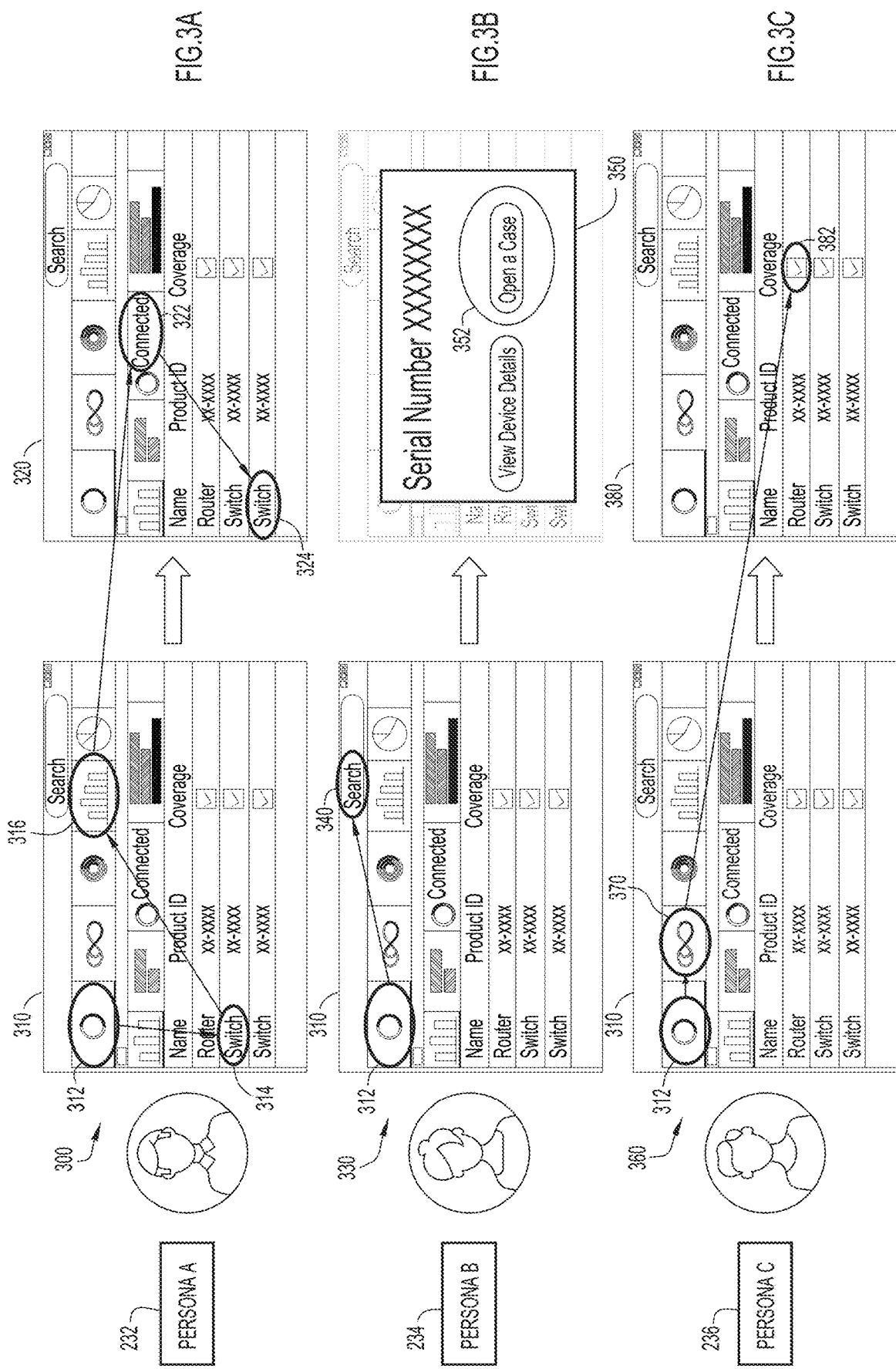

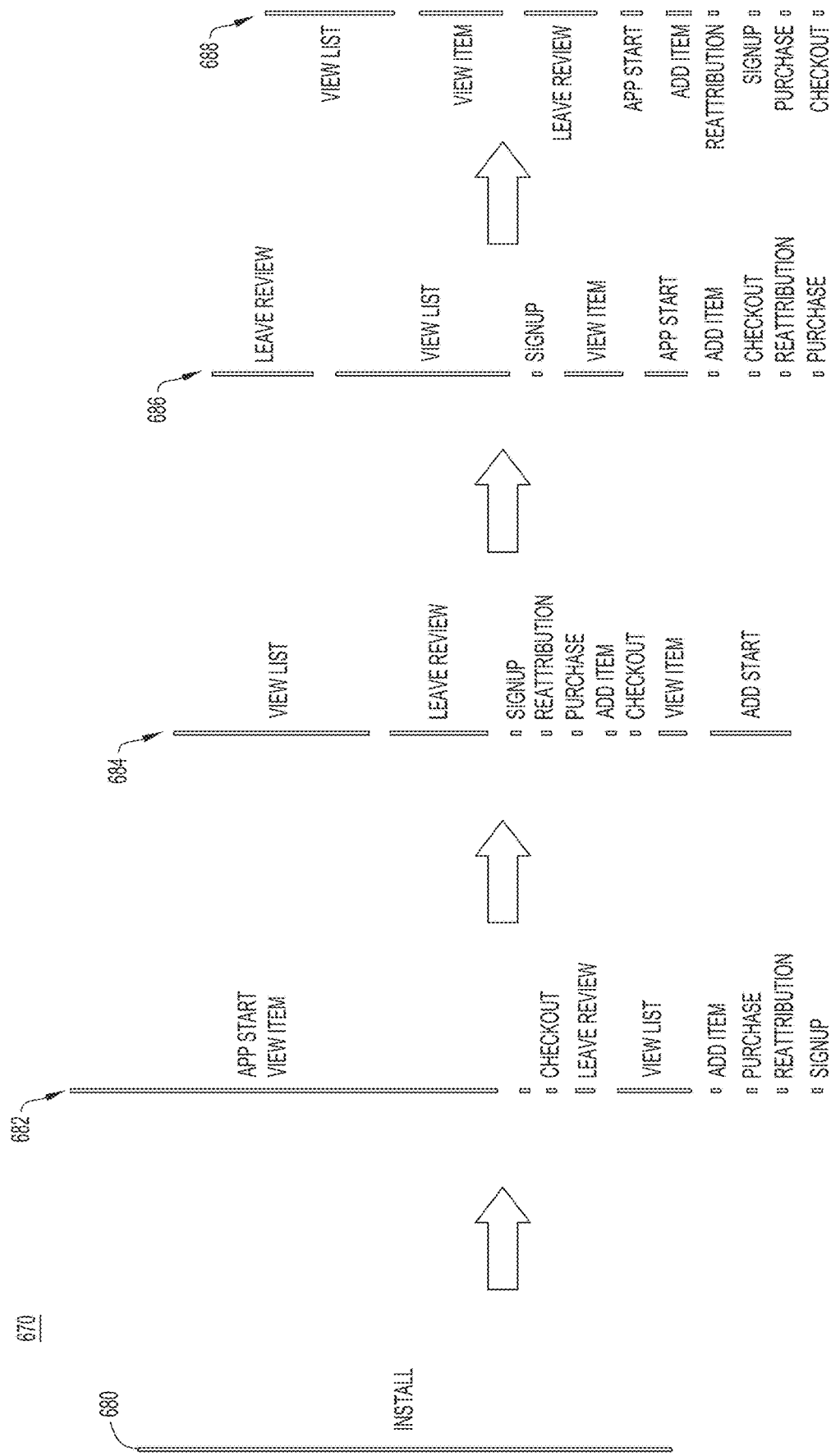

DYNAMICALLY DETECTING USER PERSONAS OF NETWORK USERS FOR CUSTOMIZED SUGGESTIONS

CROSS REFERENCE TO RELATED APPLICATION

This application is a continuation of U.S. application Ser. No. 18/155,498, filed Jan. 17, 2023, the entirety of which is incorporated herein by reference.

TECHNICAL FIELD

The present disclosure relates to tracking network activity of users, specifically to the user interface of a network user.

BACKGROUND

Not all users of a computing system are drawn to the product for the same reasons. Some users may be power users who spend a lot of time on the platform and use multiple aspects of the platform in depth. Other users may only use the product for one specific purpose and only interact with a single section of the product for a limited length of time. By identifying distinct groups of users that exhibit similar behavior, a computing system may tailor the user interface for a specific user based on their user category. In some systems, similarity graphs of user actions may be used to iteratively prune users into different categories. The different categories of users may be associated with different attributes of users to generate a qualitative understanding of the categories of users (e.g., developers, end users, administrators, support engineers, etc.).

BRIEF DESCRIPTION OF THE DRAWINGS

FIGS. 3A, 3B, and 3C illustrate specific sequences of user activity attributed to respective personas, according to an example embodiment.

FIG. 6C illustrates sequences of user activity for a third persona, according to an example embodiment.

DETAILED DESCRIPTION

Overview

A computer-implemented method is provided to dynamically detect a user persona and facilitate a user objective. The method includes obtaining user activity of a plurality of users across a plurality of historical sessions. The method also includes determining a plurality of personas by clustering similar user activity across the plurality of historical sessions. The method further includes mining a plurality of sequential patterns in a first set of user activity data associated with a first persona of the plurality of personas. The method also includes determining at least one predictive rule associated with the first persona. Each predictive rule includes an initial activity among the first set of user activity data and at least one subsequent activity in the first set of user activity data.

Example Embodiments

Cloud-based Software as a Service (SaaS) applications typically provide value to users when the users log in and explore the capabilities of the SaaS application. However, users may initially log in, briefly peruse the application, and either not find or not know what to look for to provide value. This results in sub-optimal user experiences as users exit the application or turn to user support to accomplish their objective. The techniques presented herein resolve this issue with the user experience by associating a user with a persona for the current session based on historical user sessions, mapping personas to sequences of user actions that attempt to achieve a user objective, dynamically determining a user objective based on the persona associated with the current user session, and modifying the user interface to guide the user toward a predicted user objective based on the sequence of user actions associated with the current persona. In order to determine how to effectively guide a user to a useful objective, the SaaS application may use historical data to determine personas and effective patterns of user activity.

Figure 1:
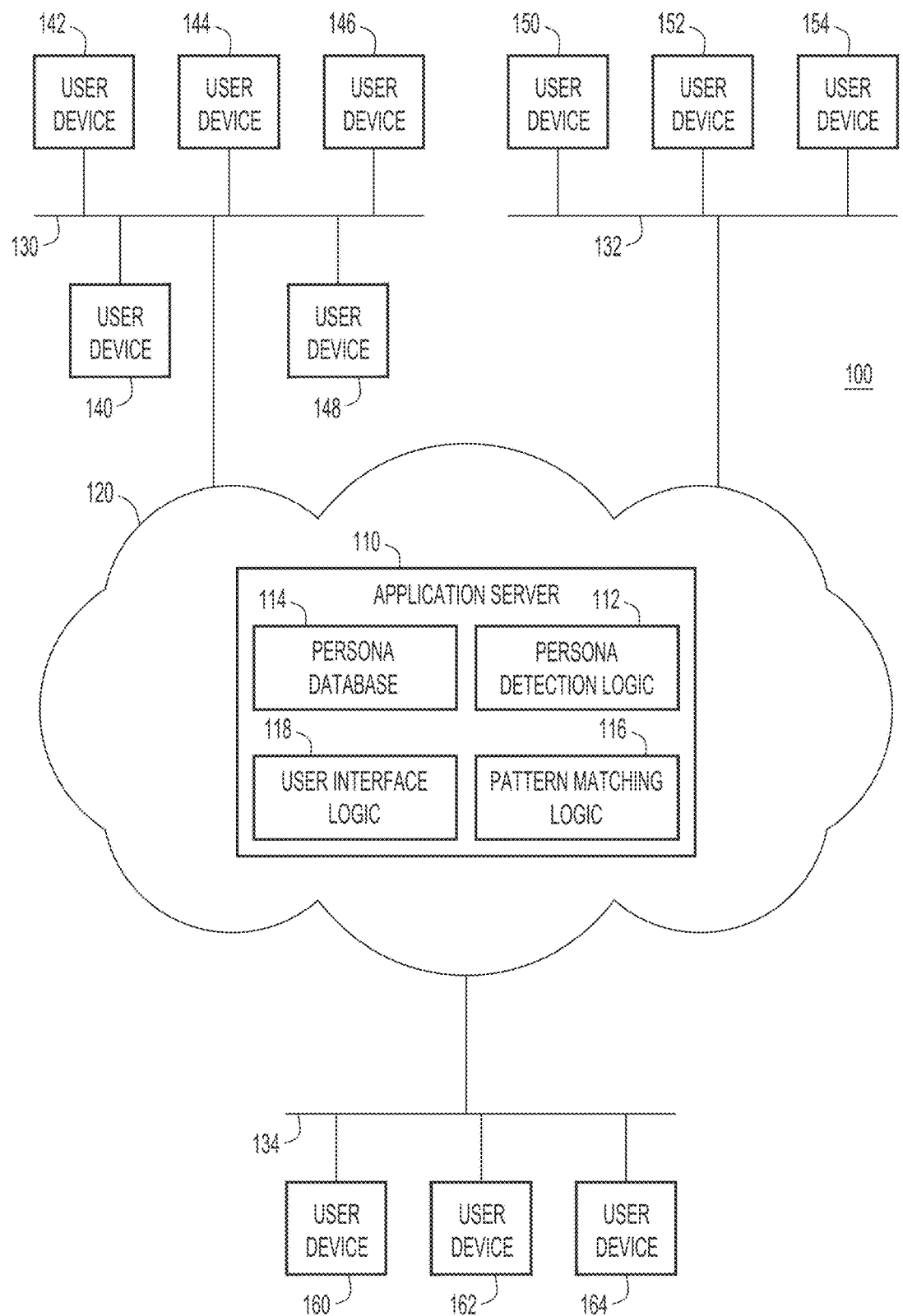
FIG. 1 is simplified block diagram of a network system configured to dynamically detect user personas and provide a customized user experience, according to an example embodiment.

Referring now to FIG. 1, a system 100 is configured to dynamically determine user objectives and guide users to achieving the user objective through an improved user interface. The system 100 includes an application server 110 that is configured to provide an application (e.g., a SaaS platform) for connected users. The application server 110 includes persona detection logic 112, a persona database 114, pattern matching logic 116, and user interface logic 118. In one example, the persona detection logic 112 enables the application server 110 to cluster historical activity from user sessions into typical personas that use the application server 110. The clustered personas may be stored in the persona database 114. In another example, the persona detection logic 112 may enable the application server 110 to dynamically determine an applicable user persona for a user in a current user session.

The pattern matching logic 116 enables the application server 110 to mine patterns from user activity in historical user sessions associated with each persona in the persona database 114. In one example, the application server 110 may convert the patterns mined by the pattern matching logic 116 into rules that predict user behavior that results in a productive user experience. The user interface logic 118 enables the application server 110 to adjust the user interface of each user device to guide the corresponding user into a productive user experience.

In another example, the application server 110 may include one or more computing devices in a cloud network 120. For instance, the application server 110 may be a cloud-based SaaS platform that provides an application to user that connect to the application server 110 through the cloud network 120. The cloud network 120 is connected to local networks 130, 132, and 134, which may be operated by one or more organizations. Hereinafter, the operations of the application server 110 may also be referred to as operations of the platform, or the SaaS platform.

In the example shown in FIG. 1, user devices 140, 142, 144, 146, and 148 connect to the application server 110 through the cloud network 120 and the local network 130. Similarly, the user devices 150, 152, and 154 connect to the application server 110 through the cloud network 120 and the local network 132. Additionally, user devices 160, 162, and 164 connect to the application server 110 through the cloud network 120 and the local network 134. The specific configuration and connection of the cloud network 120 and the local networks 130, 132, and 134 may include additional network devices and/or computing devices not explicitly shown in FIG. 1.

Figure 2A:
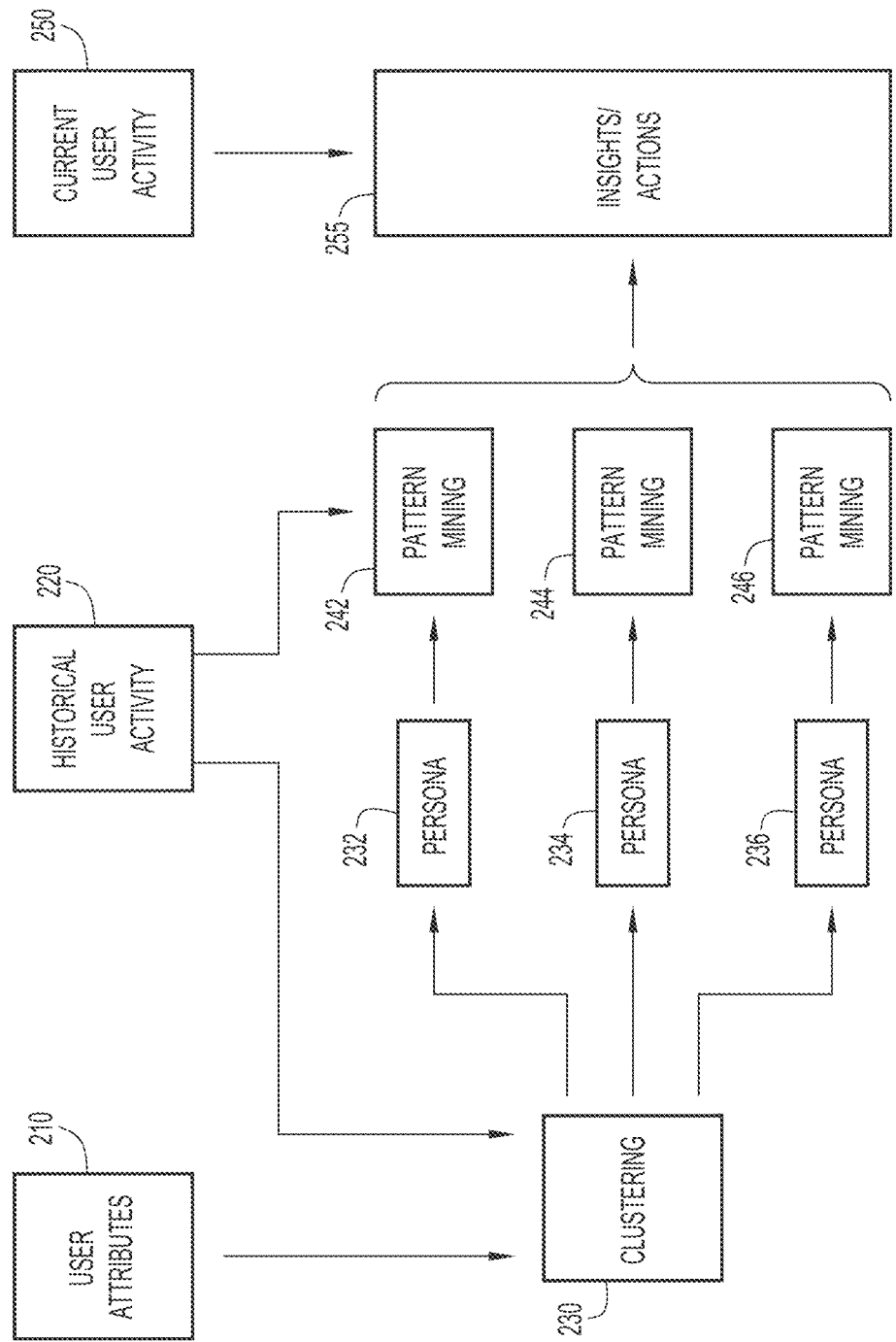
FIG. 2A illustrates a high-level overview of how a combination of user attributes and user activity translates to a customized user experience, according to an example embodiment.

Referring now to FIG. 2A, a high-level overview is shown of the performance of a platform using the techniques described herein. Initially, the platform gathers user attributes 210 and historical user activity 220. In one example, the user attributes may include user device information, network access information, and/or user role information (e.g., job title, security clearance, business group, etc.). Historical user activity 220 includes activities (e.g., clickstream data) that users have performed in previous user sessions. In one example, the historical user activity 220 may be collected across multiple users, multiple organizations, and multiple time periods.

The platform clusters the user attributes 210 and the historical user activity 220 at 230 to associate personas (e.g., persona 232, persona 234, and persona 236) with user sessions of the historical user activity 220. In one example, the clustering 230 is performed across user sessions from multiple users, and a user may have different historical sessions associated with different personas. In other words, the platform does not cluster individual users into clusters to associate personas with specific users. Instead, the platform groups user sessions into clusters associated with personas.

Dynamically assigning personas to individual user sessions allows a user to shift between personas as the user performs different activities. For instance, an initial session of a user may be clustered into a first persona (e.g., a "planner" role) as the user is onboarded into the system. However, as the user's activities shift to being more operational, the later user sessions may be clustered into a second persona (e.g., an "operator" role). By clustering user actions across different user sessions, the platform provides the flexibility for a user to operate under different personas depending on the situation. The platform may also capture any change in personas associated with the user sessions of a user over time.

Within the historical user activity 220 of user sessions associated with personas 232, 234, and 236, the platform performs pattern mining 242, 244, and 246, respectively, to find sequences of user activity that are successfully repeated within the historical user activity 220. The platform uses pattern mining 242, 244, and 246 in conjunction with the personas 232, 234, and 236 to identify specific, contextual, and actionable patterns of user activity. The platform may find sequences in the user activity of personas to eliminate inefficiencies in workflow that are specific to each persona. Limiting the pattern mining 242, 244, and 246 to user sessions associated with a particular persona may also mitigate systemic trends associated with a first persona when finding patterns for a second persona. For instance, by removing the user activity of user sessions associated with a first persona (e.g., an operator persona), the platform may identify additional sequences of user activity for a second persona (e.g., a developer persona) that would be lost in the noise of the entire set of historical user activity 220.

Once the platform has determined the personas 232, 234, and 236 that are applicable to the historical user activity 220, and the platform has identified sequences of user activity for each persona through the pattern mining 242, 244, and 246, then the platform may apply the detected personas and sequences of user activity to a current user session with current user activity 250 to develop insights 255. The insights 255 may include dynamic changes to the user interface based on a mined pattern of user activity. In other words, the platform may detect that the current user activity 250 matches a mined pattern and change the user interface of the user in the current user session to facilitate the subsequent steps of the mined pattern.

In another example, the insights 255 may include changes in the persona of a user within the current user session. For instance, the platform may initially associate a user session with a first persona based on the initial user activity in the current user session, but later user activity may lead the platform to changing the persona, and the associated mined patterns of user activity, of the user session to a second persona. Additionally, the insights may include workflow analysis per persona (e.g., what user activities are being used by an operator persona to achieve a specific objective) and/or overall analysis of platform usage per persona (e.g., how often are technical support persona sessions being observed by the platform).

Figure 2B:
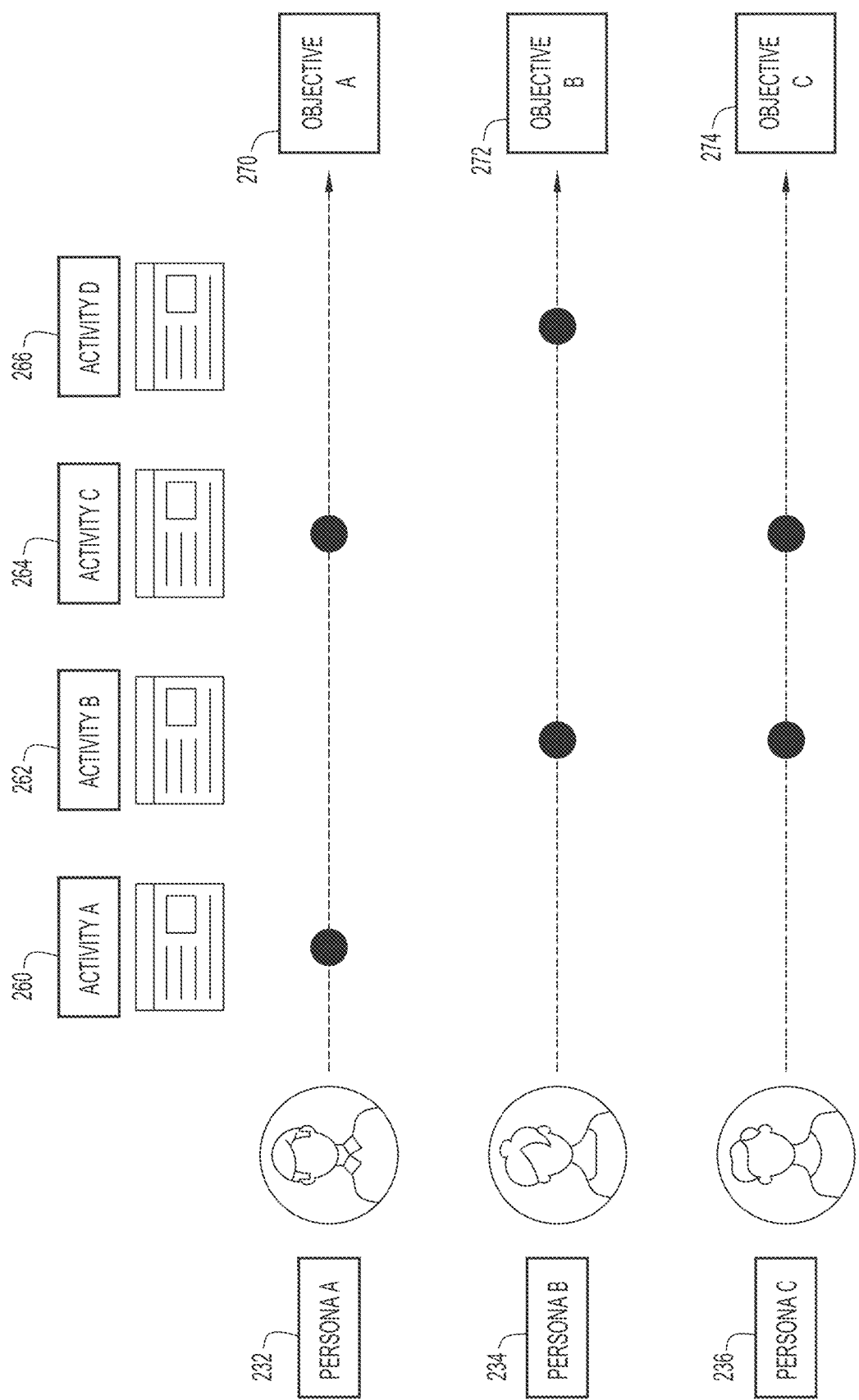
FIG. 2B illustrates a pattern of activity performed by different user personas, according to an example embodiment.

Referring now to FIG. 2B, a block diagram illustrates how the platform associates certain action sequences and user objectives with a particular persona. In the simplified depiction of FIG. 2B, user sessions may include one or more of user activities 260, 262, 264, and 266. The user activity in user sessions associated with persona 232 include user activity 260 and user activity 264. The user activity in user sessions associated with persona 234 include user activity 262 and user activity 266. The user activity in user sessions associated with persona 236 include user activity 262 and user activity 264. In one example, the user activity 260, 262, 264, or 266 may include interacting with a specific web page or application element.

Based on the different activities associated with each persona, a user objective may be determined and associated with each persona. Persona 232 (e.g., a support engineer persona) is associated with an objective 270 (e.g., opening a support case) due to user activity 260 and 264. Persona 234 (e.g., an operator persona) is associated with objective 272 (e.g., launching the platform suite) due to user activity 262 and 266. Persona 236 (e.g., an auditor persona) is associated with objective 274 (e.g., performing a global search) due to user activity 262 and 264.

In one example, associating user personas with user objectives based on user activities enables the platform to categorize users in a concrete and context-sensitive way. With distinct categorizations, the platform may gather a detailed view of user behavior and facilitate an optimized user experience to achieve user objectives.

In another example, the platform may define the start of a user session based on when a user logs into the platform. Alternatively, a new user session may begin each day or each time the user visits a particular portion of the platform, such as a home page. For instance, the platform may begin tracking a user session when a user visits the home page for their organization, even if the user is already logged into the platform (e.g., by a cookie or certificate).

Referring now to FIGS. 3A-3C, specific examples of user activity associated with different personas is shown. FIG. 3A illustrates a sequence 300 of user actions that are associated with persona 232. The sequence 300 starts with the user accessing an application window 310 and selecting element 312 to update the display of the window 310. The sequence 300 continues with the user selecting item 314 and selecting element 316 to update at least a portion 320 of the window 310. The sequence 300 proceeds with the user selecting element 322 from the updated portion 320, and the sequence concludes with the user selecting item 324.

FIG. 3B illustrates a sequence 330 of user actions that are associated with persona 234. The sequence 330 starts with the same initial steps of sequence 300 of the user accessing an application window 310 and selecting element 312 to update the display of the window 310. The sequence 330 continues with the user entering data into element 340, which generates an overlay 350 on a portion of the window 310. The sequence 330 proceeds with the user selecting element 352 from the overlay 350.

FIG. 3C illustrates a sequence 360 of user actions that are associated with persona 236. The sequence 360 starts with the same initial step of sequence 300 and sequence 330 of the user accessing an application window 310 and selecting element 312 to update the display of the window 310. The sequence 360 continues with the user selecting element 370, which navigates to a new window 380. The sequence 360 proceeds with the user selecting element 382 from the new window 380.

Figure 4:
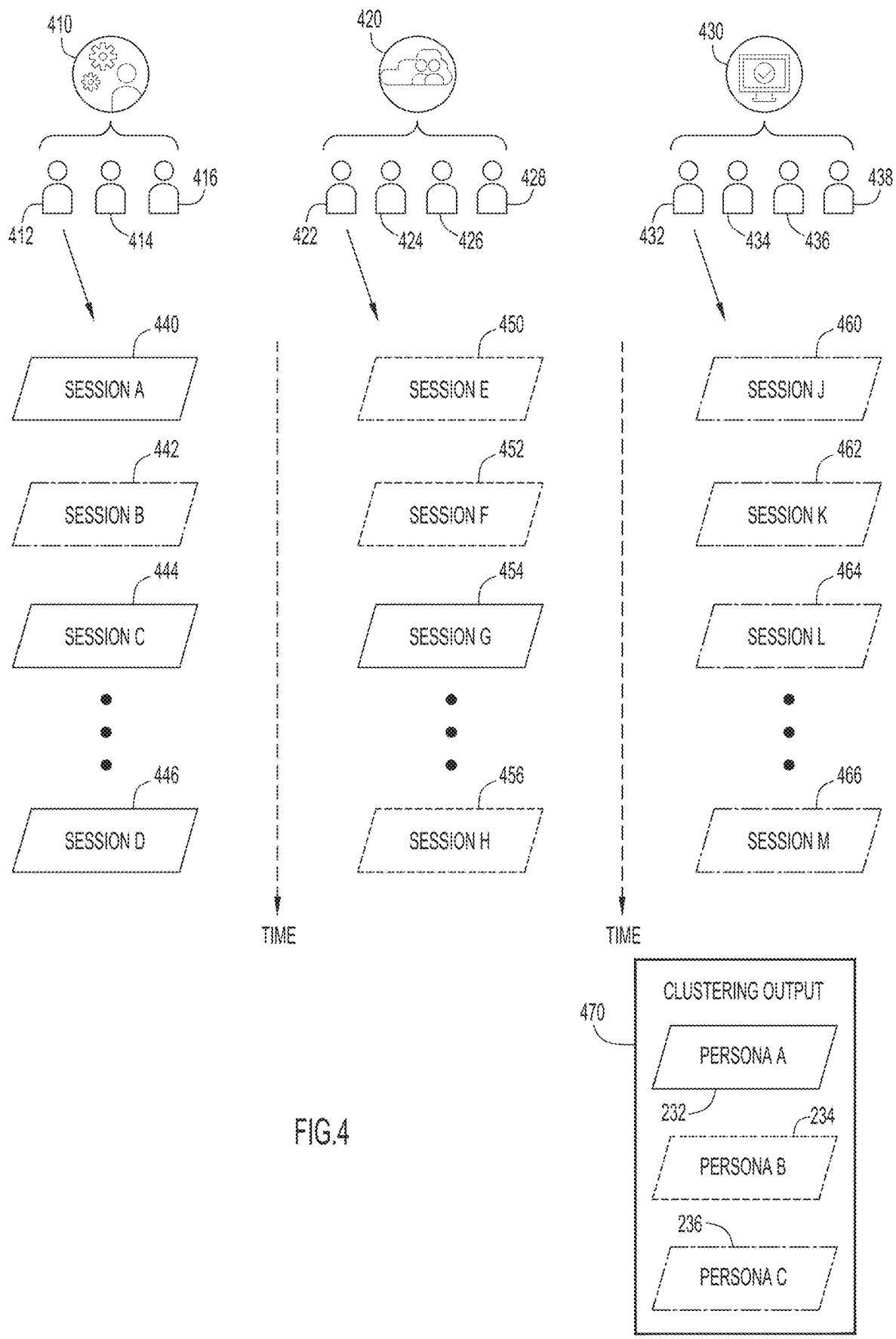
FIG. 4 illustrates clustering historical user activity data into personas across different user sessions, according to an example embodiment.

Referring now to FIG. 4, an example shows how the platform clusters user sessions into personas. The example of FIG. 4 shows user sessions from users at organizations 410, 420, and 430. The organization 410 includes users 412, 414, and 416. The organization 420 includes users 422, 424, 426, and 428. The organization 430 includes users 432, 434, 436, and 438. The platform records user sessions 440, 442, 444, and 446 from organization 410. Similarly, the platform records user sessions 450, 452, 454, and 456 from one or more users at organization 420, and user sessions 460, 462, 464, and 466 from one or more users at organization 430.

The key 470 shows how different user sessions are associated with different personas. For instance, user sessions 440, 444, 446, and 454 are all associated with persona 232, as indicated by the solid outline of the user sessions 440, 444, 446, and 454. User sessions 450, 452, and 456 are all associated with the persona 234, as indicated by the dashed outline of the user sessions 450, 452, and 456. The user sessions 442, 460, 462, 464, and 466 are all associated with the persona 236, as indicated by the dash-dotted outline of the user sessions 442, 460, 462, 464, and 466. The platform associates each user session with a persona by clustering similar user activities (e.g., as shown in FIGS. 3A-3C).

In one example, the user sessions 440, 442, 444, and 446 are from a single user (e.g., user 412) of the organization 410. The user 412 is associated with different personas over time, as illustrated by the user sessions 440, 444, and 446 being clustered with the persona 232 and the user session 442 being clustered with the persona 236. Similarly, the user sessions 450, 452, 454, and 456 may be from a single user (e.g., user 422) of the organization 420. Like the user 412, the user 422 is associated with different personas over time, as illustrated by the user sessions 450, 452, and 456 being clustered with the persona 234 and the user session 454 being clustered with the persona 232. The user sessions 460, 462, 464, and 466 may be from a single user (e.g., user 432) of the organization 430. In contrast to the user 412 and the user 422, the user 432 is only associated with a single persona over time, as illustrated by the user sessions 460, 462, 464, and 466 being clustered with the persona 236.

Figure 5A:
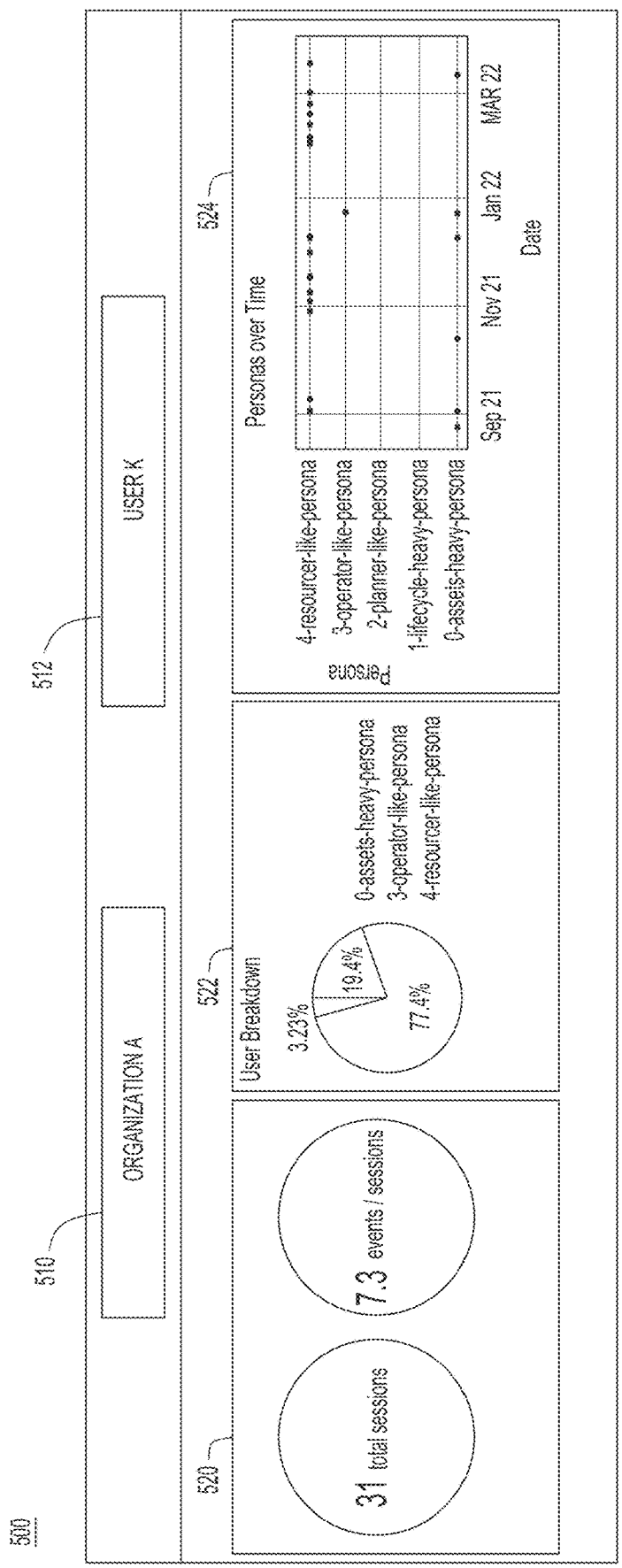
FIG. 5A illustrates an example of user activity and persona statistics across historical user sessions, according to an example embodiment.

By clustering the user activity by user session instead of by user, the platform may determine statistics related to specific users and how the user activity of that user changes over time. Referring now to FIG. 5A, a dashboard 500 shows persona statistics of a user 512 in an organization 510. The dashboard 500 includes an element 520 that displays how many user sessions the user 512 has logged, as well as the average number of activities performed in those sessions. The dashboard 500 also includes another element 522 (e.g., a pie chart) that breaks down the percentage of user sessions associated with different personas. Additionally, the simulated screenshot includes an element 524 (e.g., a graph) that plots each user session over time along with the persona associated with each user session.

In one example, the features of the user activity for which the personas are determined may be based on user activity data that happens at the user session level. Sequential data may be converted into a quantitative format that is passed to a clustering algorithm. One method for converting the sequential list of user activity into a quantitative format comprises calculating certain quantitative attributes that are already present in the sessions data, such as the duration of the session or the number of user activities recorded in the user session.

Another method includes creating quantitative attributes through aggregation. For instance, various factors, such as the area of the site or type of events may be represented as the percentage of the user session that the user spent interacting with that factor. In other words, a particular persona may be associated with spending at least 75% of the user session interacting with a particular platform element (e.g., a list of customer support tickets). This type of quantitative data enables the platform to differentiate between user sessions in a way that is conducive to clustering into different personas. However, this type of quantitative data results in the loss of order of events in the user activity.

In another example, different features of user activity may be weighted more heavily when clustering the user activity to determine personas. Depending on the direct application or domain, the platform may adjust weights within the clustering model to favor certain attributes of the user activities over others. In other words, the platform may determine that the user interface elements with which the user interacts may be more useful in determining an appropriate persona than the overall time of the user session, and the platform may lower the weight of the overall session time in the clustering algorithm.

In a further example, the platform may cluster the user activity using typical clustering algorithms (e.g., k-means, Density-Based Spatial Clustering of Application with Noise (DBSCAN), or Expectation-Maximization (EM) clustering). In some instances, the platform may insert domain knowledge into the clustering algorithm by appropriate selection of the number of clusters (i.e., k) in the k-means clustering algorithm. If the platform operators have a theory on a likely number of personas that will use their platform, they may manually select that number for the k-means algorithm to increase the performance of the k-means algorithm relative to other clustering algorithms. For instance, sequential user activity data is typically extremely dense and other clustering algorithms, such as DBSCAN, may simply group all of the data into a single cluster.

Figure 5B:
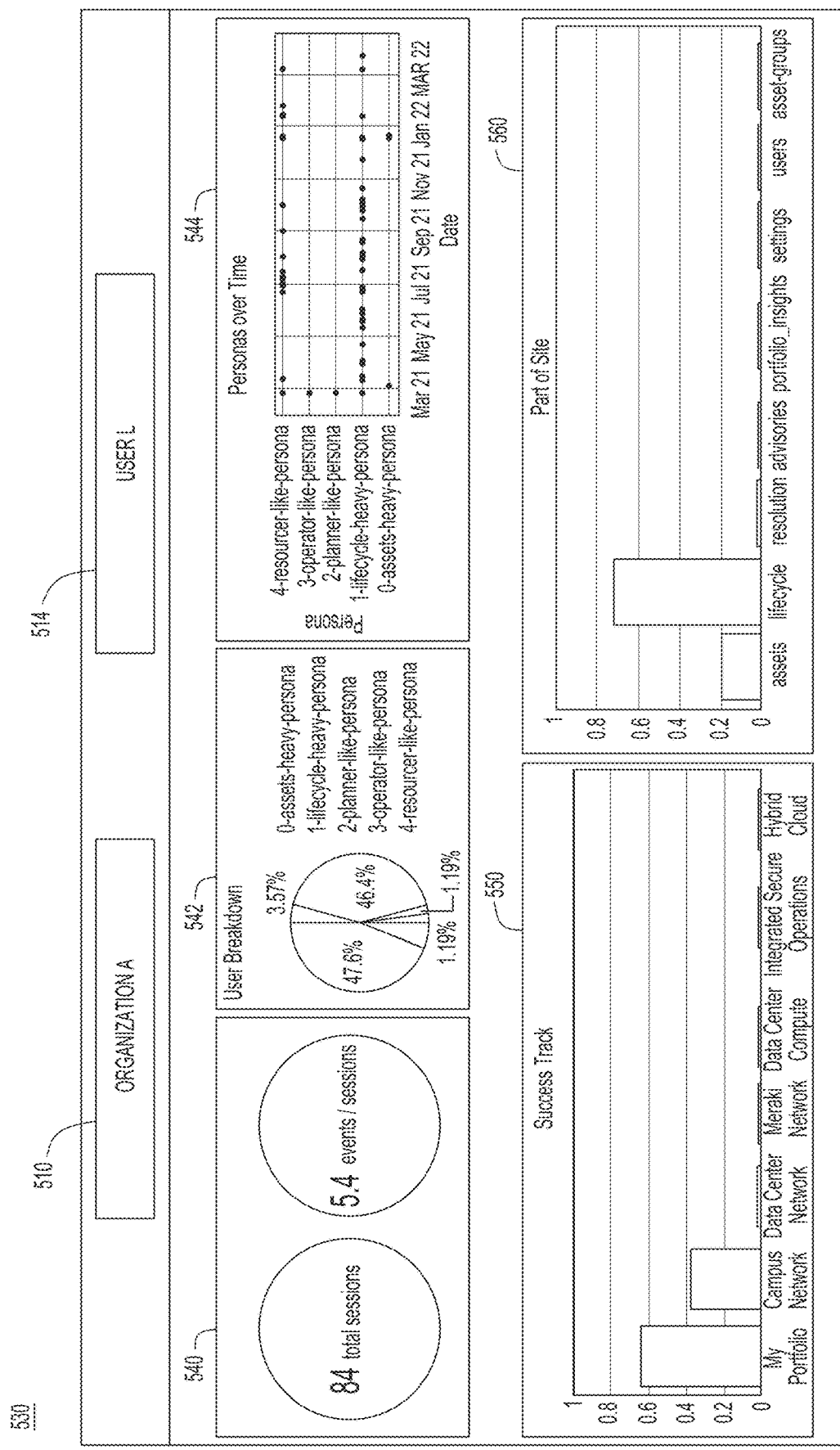
FIG. 5B illustrates an example of user activity, user goal, and persona statistics across historical user sessions, according to an example embodiment.

Referring now to FIG. 5B, a dashboard 530 shows user activity and objective analytics in addition to the persona statistics for a user 514 in the organization 510. In addition to the elements 540, 542, and 544 that display the corresponding statistics for user 514 that are shown in elements 520, 522, and 524 of FIG. 5A, the dashboard 530 includes elements 550 and 560 that display statistics related to the user activities of the user 514 by showing which portions of the platform correspond to the user activities of the user 514 during their user sessions. The elements 550 and 560 differ by how the platform is logically divided into subsections.

The element 550 (e.g., a bar graph) illustrates the percentage of the user activities that were associated with different success tracks. In one example, 61% of the user activities performed by the user 514 were related to the success track of "My Portfolio" and 36% of the user activities were related to the success track of "Campus Network." The element 560 (e.g., a bar graph) illustrates the percentage of the user activities that were associated with different parts of the platform on which the user 514 spent time during their user sessions. In one example, 70% of the user activities were performed on parts of the platform related to assets and 20% of the user activities were performed on parts of the platform related to the lifecycle.

In another example, the elements 550 and 560 may be configured to divide the platform according to different metrics, such as geographical location. For instance, one of the elements 550 or 560 may display the percentage of user activities associated with a San Jose site or a New York site. Additionally, the elements 550 and 560 may be configured to display the user activity statistics in a different format, such as a pie chart.

Figure 6A:
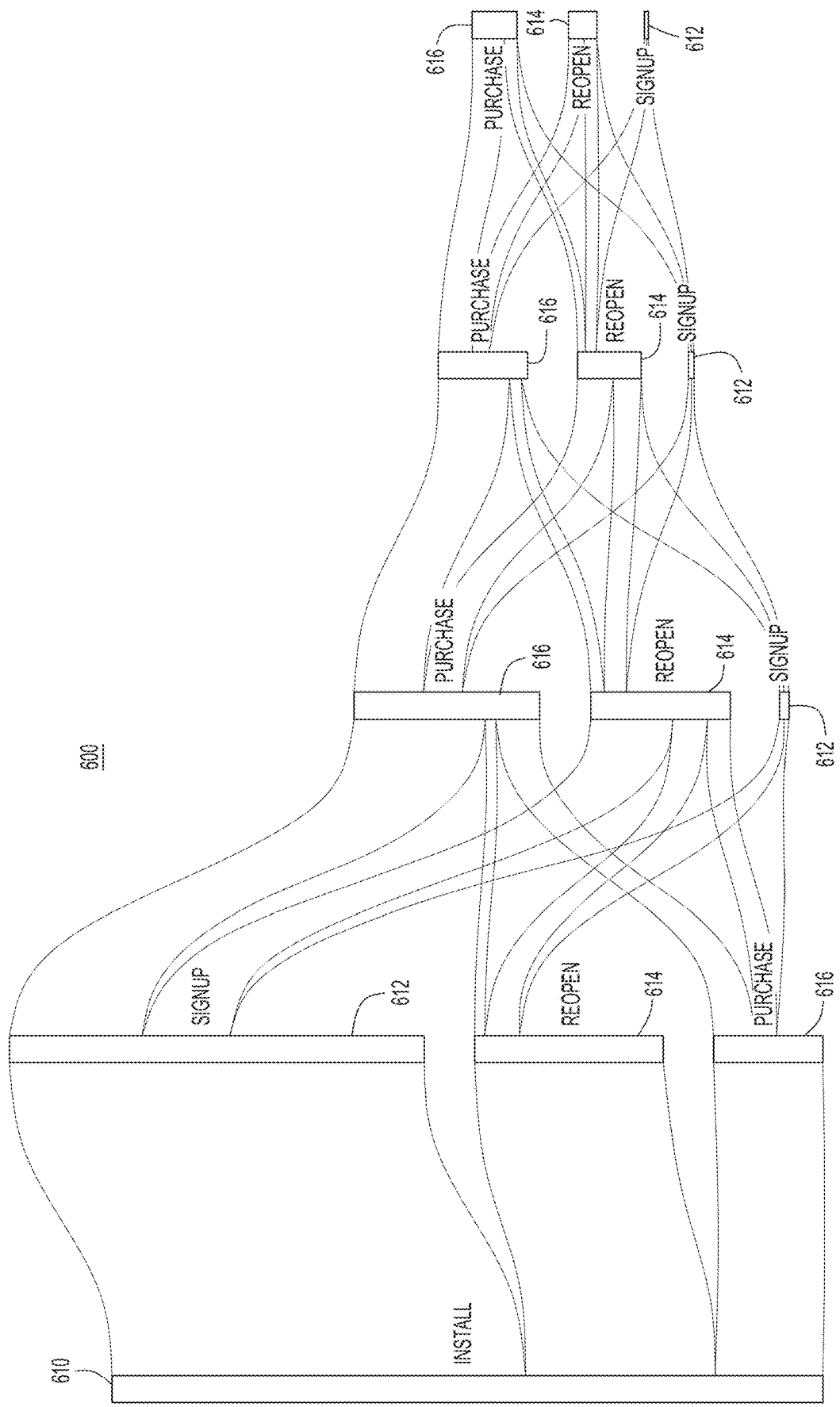
FIG. 6A illustrates sequences of user activity for a first persona, according to an example embodiment.

Referring now to FIG. 6A, a diagram illustrates an example flow 600 of user activity for a persona (e.g., a shopper) using the platform (e.g., a shopping application) according to the techniques described herein. The flow 600 begins by showing that all users install the application at 610. After installing the application, most users sign up for the platform at 612, some users reopen a previously viewed item at 614, and some users purchase an item at 616. At each successive step, some users continue on to other parts of the platform (e.g., signup 612, reopen 614, or purchase 616), and other users exit the platform, as shown by fewer connections leaving each step than entering the step. In one example, the platform may gain insight and strategies to guide users toward particular steps (e.g., a purchase 616) or away from leaving the platform. For instance, if the platform detects that users who reopen an item as their first step at 614 are less likely to proceed to signup 612 or purchase 616, then the platform may alter the user interface to reduce the likelihood of immediately performing the reopen 614 after installing the application.

Figure 6B:
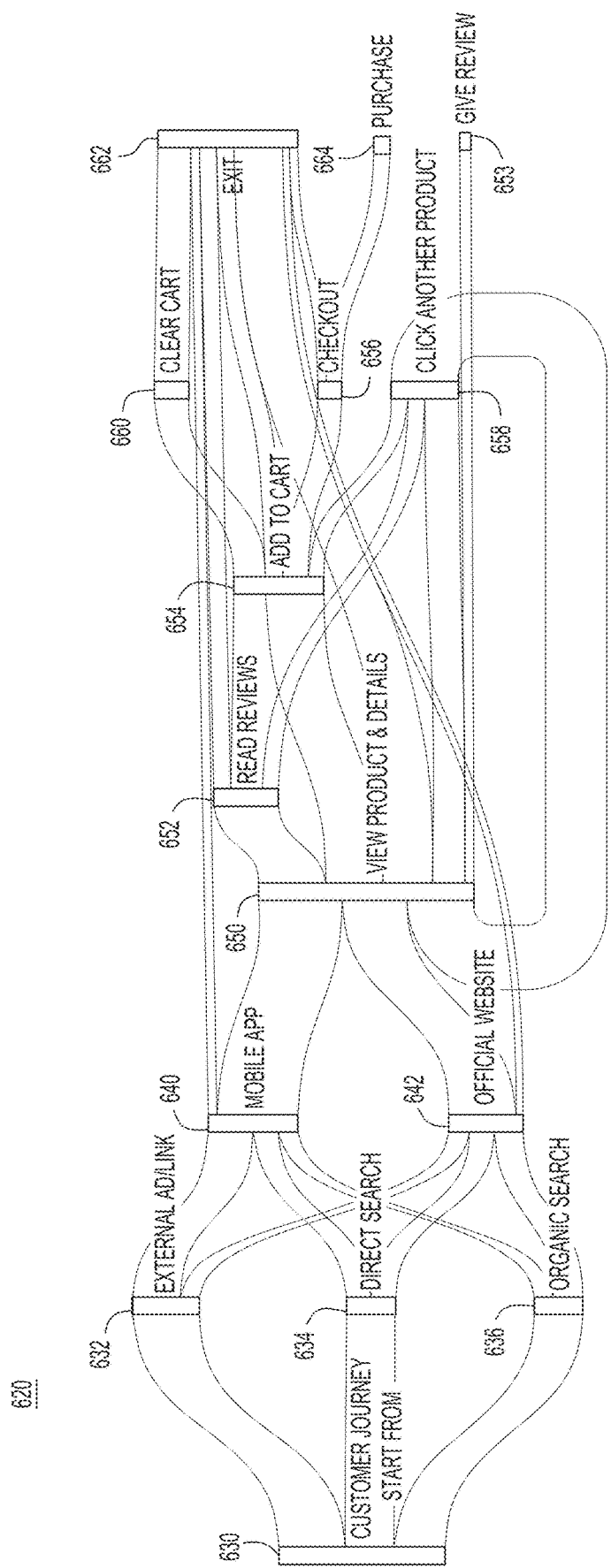
FIG. 6B illustrates sequences of user activity for a second persona, according to an example embodiment.

Referring now to FIG. 6B, a diagram illustrates an example flow 620 of user activity for a persona (e.g., a shopper) using the platform (e.g., a shopping application according to the techniques described herein. The flow 620 begins at 630 with a determination of the source from which the user entered the platform (e.g., from an external ad/link 632, from a direct search 634 for the platform, or from an organic search 636). Each of the sources (e.g., external ad/link 632, direct search 634, and organic search 636) may direct the user to the mobile application 640 of the platform or the main website 642 of the platform.

Once on the platform, the user views products at 650, which may cause the user to read reviews at 652, write a review at 653 for the product, add the product to a shopping cart at 654, go to checkout at 656, or click on another product at 658. The flow 620 may continue with the user clearing their cart at 660, before exiting the platform at 662. Alternatively, the user may simply exit the platform at 662 after other steps, such as after viewing a product at 650. After the user goes to the checkout at 656, the user may complete the purchase at 664 or the user may change their mind and simply exit the platform at 662.

Referring now to FIG. 6C, a diagram illustrates an example flow 670 of user activity for a persona using the platform according to the techniques described herein. The flow 670 begins when users install the platform at 680 and select an initial user activity at 682. In one example, the initial user activity may be starting an application, viewing an item, checking out, leaving a review, viewing a shopping list, adding an item, completing a purchase, reattributing, or signing up for the platform. The flow 670 continues to track subsequent user activity at 684, 686, and 688. The user activities at each of the steps 684, 686, and 688 may include the same activities as described with respect to step 682.

In one example, breaking up the user activity data by persona (e.g., as shown in FIGS. 6A-6C) enables the platform to perform workflow analysis and find trends and patterns specific to each persona. Since the persona were generated by clustering historical user activity, stronger patterns emerge and subtler patterns that would have been swamped by the noise of the entire dataset may be discerned. Additionally, deviations may become more noticeable due to the concentrated dataset. Furthermore, the platform may make comparisons between the user activity patterns of different personas to generate additional insights on the similarities and differences between personas and how to facilitate an efficient user experience based on the persona of the user's current activity.

Figure 7:
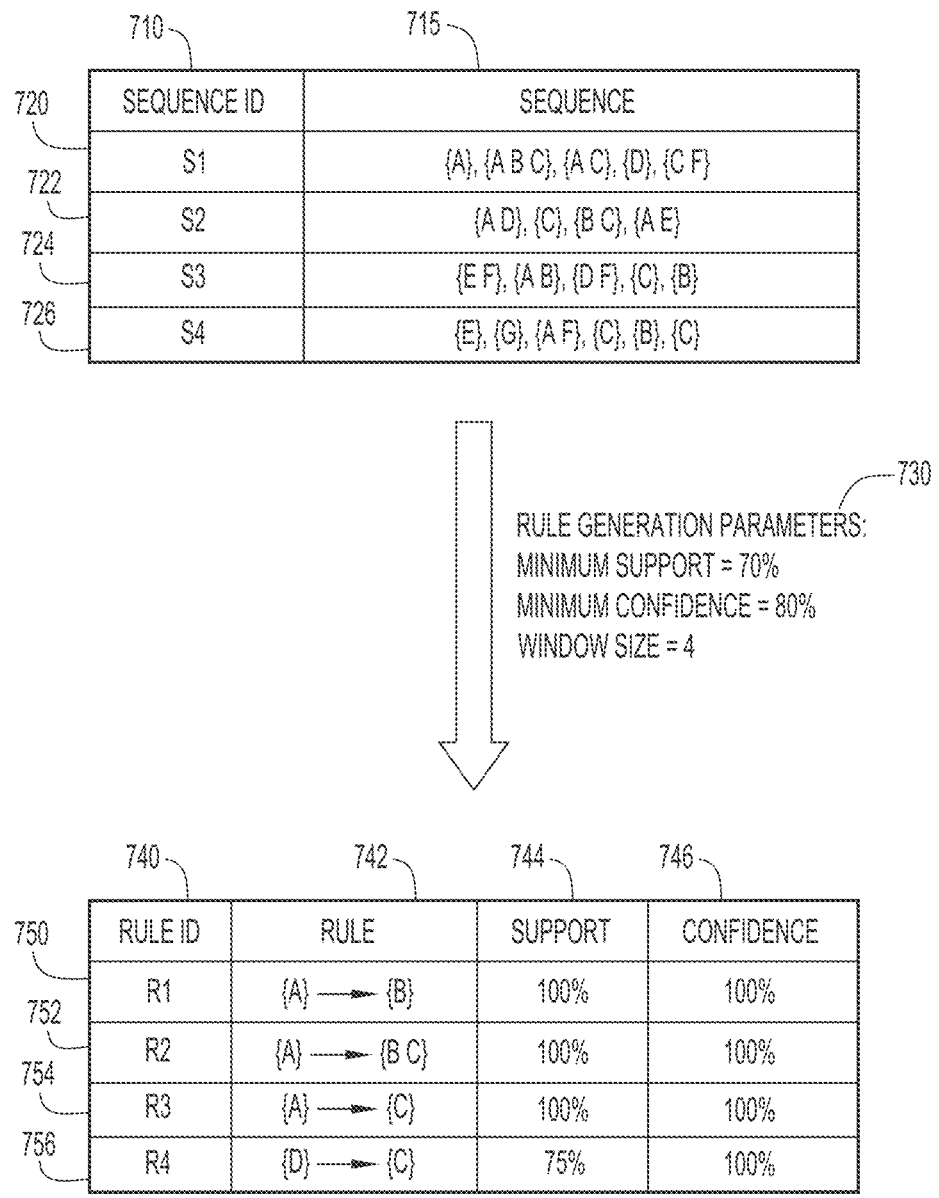
FIG. 7 illustrates a process for generating rules for expected user activity based on mining patterns from historical user activity data, according to an example embodiment.

Referring now to FIG. 7, an example of the platform converting sequences of user activity of a persona into concrete, actionable, predictive rules is shown. The platform stores sequences of user activity in a database that associates a sequence identifier 710 with a sequence 715 of user activities. In the example shown in FIG. 7, sequence 720 is associated with sequence identifier S1 and includes a sequence of user activities A, B, C, D, and F. The sequence 722 is associated with sequence identifier S2 and includes a sequence of user activities A, B, C, D, and E. The sequence 724 is associated with sequence identifier S3 and includes a sequence of user activities A, B, C, D, E, and F. The sequence 726 is associated with sequence identifier S4 and includes a sequence of user activities A, B, C, E, F, and G.

The platform mines specific rules from the sequences 715 by searching for segments of user activities that include an initial user activity followed by one or more subsequent user activities. The platform imposes predetermined parameters 730 to filter for segments of user activity that are reliable indicators of a user's predicted actions. In one example, the parameters include a minimum level of support to ensure that the initial user activity for a potential rule occurs in a significant percentage (e.g., 70%) of the recorded sequences of user activity for the persona. In another example, the parameters 730 may include a minimum level of confidence to ensure that a minimum percentage (e.g., 80%) of recorded sequences with the initial user activity also include the subsequent user activity. In a further example, the parameters 730 may include a window size to ensure that the subsequent user activities occur within a specified number (e.g., 4) of user actions after the initial user activity for the rule.

From the sequences 720, 722, 724, and 726, the platform identifies four patterns as rules that conform to the parameters 730. The rules may be stored in a database associating a rule identifier 740, a rule 742 defining the initial user activity and the subsequent user activity, a support level 744, and a confidence level 746. The platform identifies a rule 750 associating the rule identifier R1 with a rule that states that if a user performs user activity A, then the user will follow up with user activity B within four actions. The rule 750 has a support level of 100% since all four sequences 720, 722, 724, and 726 include user activity A. The rule 750 has a confidence level of 100% since all four sequences 720, 722, 724, and 726 with user activity A include an instance of user activity B following an instance of user activity A.

The platform also identifies a rule 752 associating the rule identifier R2 with a rule that states that if a user performs user activity A, then the user will follow up with user activity B and user activity C, in any order, within four actions. The rule 752 has a support level of 100% since all four sequences 720, 722, 724, and 726 include user activity A. The rule 752 has a confidence level of 100% since all four sequences 720, 722, 724, and 726 with user activity A include an instance of user activity B and an instance of user activity C following an instance of user activity A.

The platform also identifies a rule 754 associating the rule identifier R3 with a rule that states that if a user performs user activity A, then the user will follow up with user activity C within four actions. The rule 754 has a support level of 100% since all four sequences 720, 722, 724, and 726 include user activity A. The rule 754 has a confidence level of 100% since all four sequences 720, 722, 724, and 726 with user activity A include an instance of user activity C following an instance of user activity A.

The platform also identifies a rule 756 associating the rule identifier R4 with a rule that states that if a user performs user activity D, then the user will follow up with user activity C within four actions. The rule 756 has a support level of 75% since three sequences 720, 722, and 724 include user activity D, but sequence 726 does not include user activity D. The rule 756 has a confidence level of 100% since all three sequences 720, 722, and 724 with user activity D include an instance of user activity C following an instance of user activity D.

Figure 8:
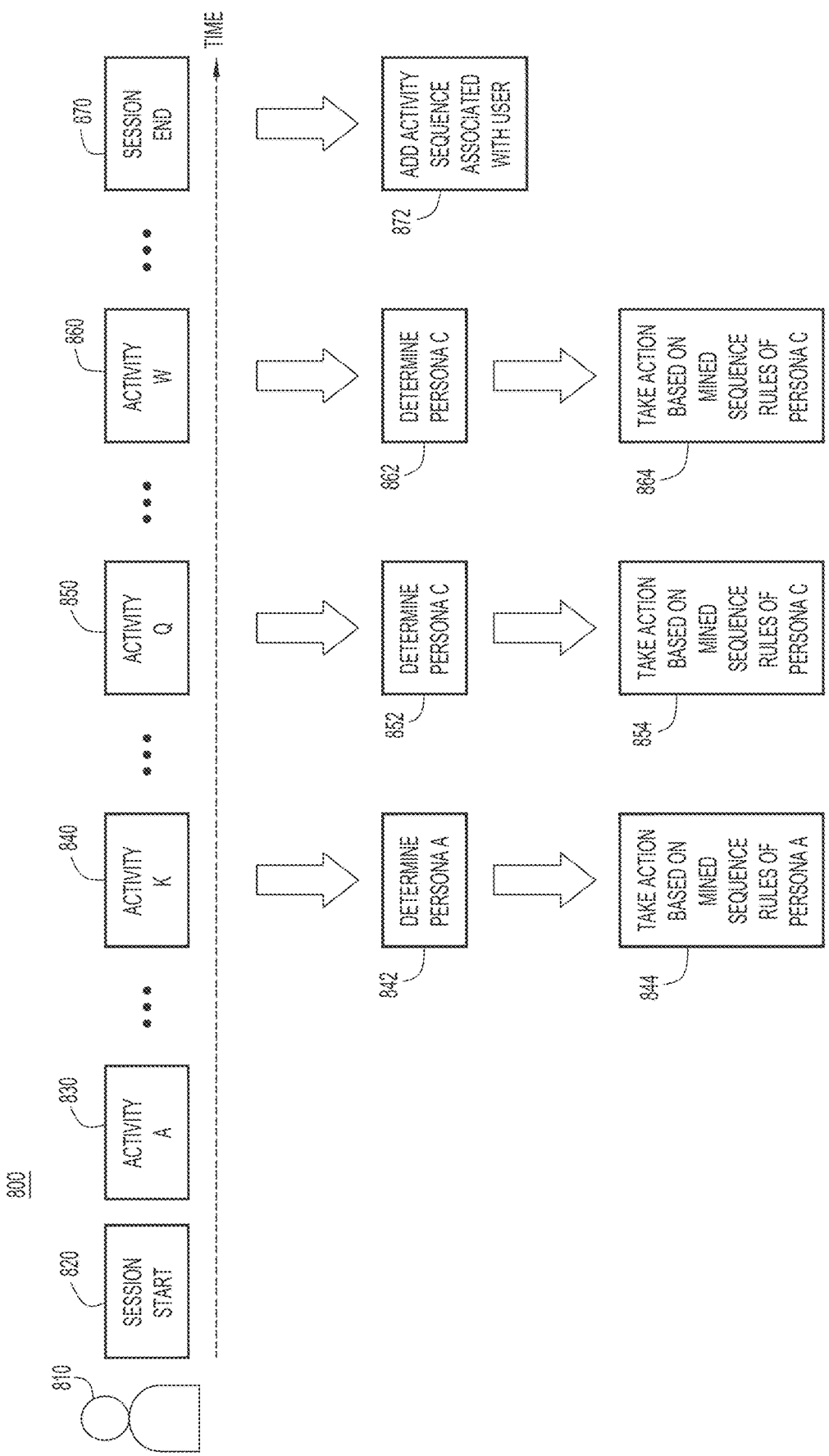
FIG. 8 illustrates how current user activity is handled update the user interface based on a dynamically determined user persona, according to an example embodiment.

Referring now to FIG. 8, a diagram 800 illustrates how the platform dynamically determines a persona in a current user session and applies the rules mined from patterns in the historical user activity to facilitate the current user session. A user 810 begins the user session at 820 and first performs an activity A at 830. After the user 810 has performed sufficient user activities (e.g., a number K activities) at 840, the platform determines that the user 810 is acting with a persona A at 842. In response to determining that the user 810 is acting with the persona A, the platform consults the patterns mined from the historical user session of associated with persona A. Based on the mined patterns and any rules associated with the mined patterns, the platform may take an action (e.g., adjust the user interface) at 844 to facilitate a user objective associated with the persona A.

As the current session continues and the user performs additional user activities (e.g., up to activity Q) at 850, the platform reassesses the user activity in the current user session and determines that the user 810 has changed to acting according to persona C at 852. In response to the changed persona, the platform consults the patterns mined from the historical user session of associated with persona C. Based on the mined patterns and any rules associated with the mined patterns, the platform may take an action (e.g., adjust the user interface) at 854 to facilitate a user objective associated with the persona C.

After the user 810 has performed further user activities (e.g., activity W) at 860, the platform reassesses the user activity in the current user session and determines that the user 810 remains consistent with persona C at 862. The platform may take further action (e.g., adjust the user interface) at 864 to facilitate a user objective associated with the persona C.

Once the current user session ends at 870, the platform adds the sequence of activities performed in the current user session to the database of historical user sessions at 872. The user session that ended at 870 may be stored in association with the persona that was most recently determined by the platform (e.g., persona C determined at 864). Alternatively, the user session may be stored in association with each persona that was determined to be a relevant persona during the user session (e.g., persona A and persona C). Updating the database of historical user sessions provides the platform with additional data to improve the determination of personas and mine additional sequences of user activity.

In one example, the platform may record the user activity of the user 810 in near real-time (e.g., the user clicks an element, a tracking record is generated, and stored in the database for further analysis.), enabling predictive actions to be taken in the middle of user sessions. The platform may update predictions multiple times in a user session and adjust the user interface accordingly. Downstream tasks may leverage the predicted persona while the platform continues to make predictions about the user activity and adjust the user interface.

Figure 9A:
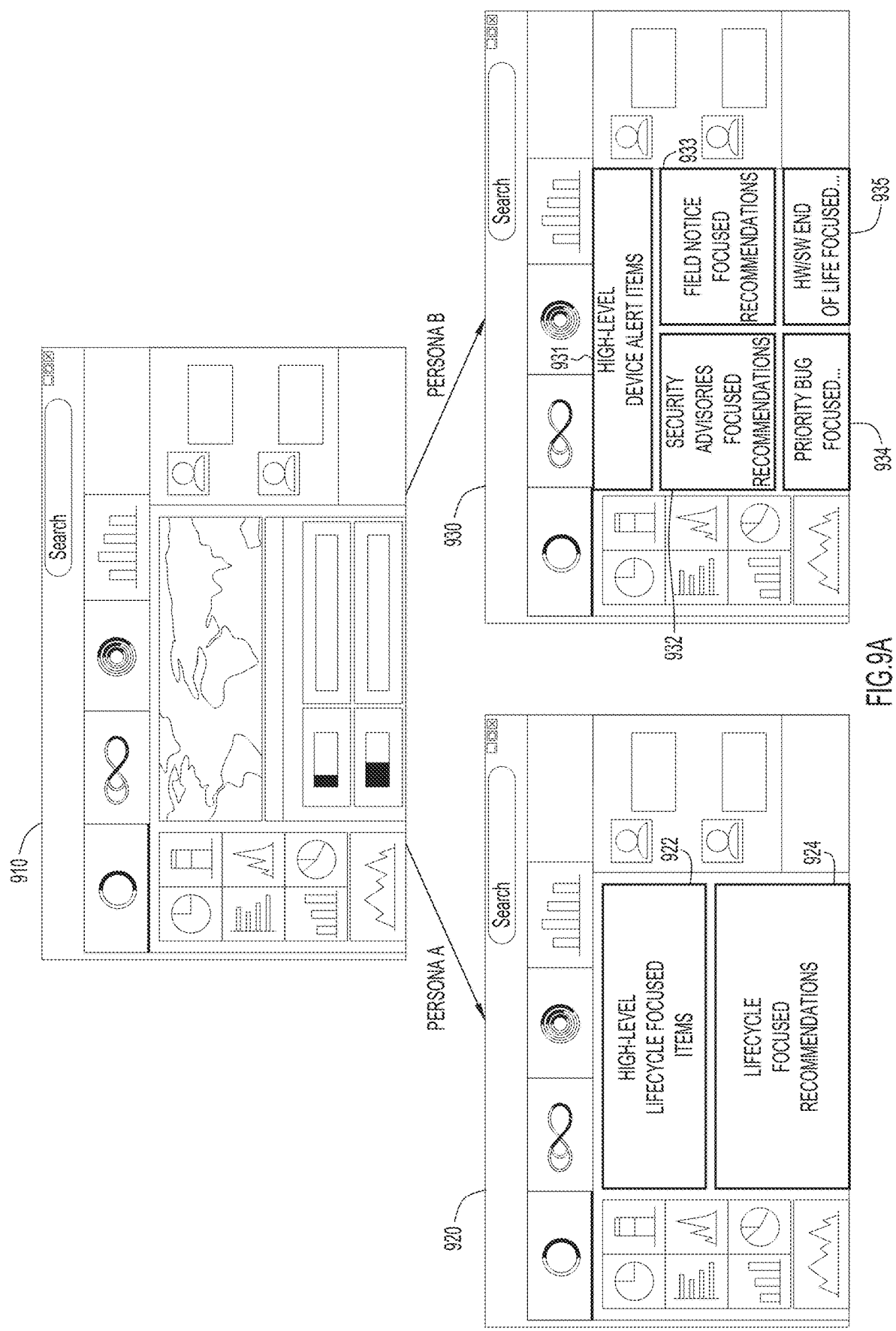
FIG. 9A illustrates customizing a user interface based on a determined user persona, according to an example embodiment.

Referring now to FIG. 9A, simulated screenshots illustrate how a user interface provided to a user may be adjusted based on the persona of the current user session. Initially, a generic user interface 910 may be provided to a user until the platform has gathered sufficient information from the user activity to determine an appropriate persona for the user session. If the user activity of the user in the current session causes the platform to determine that the user is acting with a first persona (e.g., persona A), then the platform may adjust the user interface 910 to show a user interface 920 with elements 922 and 924 that are more often used by users of that persona. If the user activity of the user in the current session causes the platform to determine that the user is acting with a second persona (e.g., persona B), then the platform may adjust the user interface 910 to show a user interface 930 with elements 931, 932, 933, 934, and 935 that a more often used by users of that persona.

In one example, the platform may update the user interface dynamically throughout the user session as the user activity changes and the platform determines that a different persona is more appropriate. For instance, the platform may shift directly from user interface 920 to user interface 930 if the user activity shifts from persona A to persona B.

In another example, the platform may improve the user experience by customizing/personalizing a user interface and providing recommendations based on the current persona of the user. The user interface may be updated to prominently display the key activities, actions, and interests of a persona so the user can quickly and efficiently perform the user activities most applicable to their role. For cases in which a user acts as multiple personas within a user session, the platform may rank the importance of each user interface element based on the user's recent persona.

In a further example, the platform may maintain certain elements of the user interface constantly displayed to reduce confusion that may arise from completely changing the display seen by the user. For instance, the platform may keep a display of certain navigation elements to show the user that other elements of the platform are still available and enable the user to navigate to other platform elements.

Figure 9B:
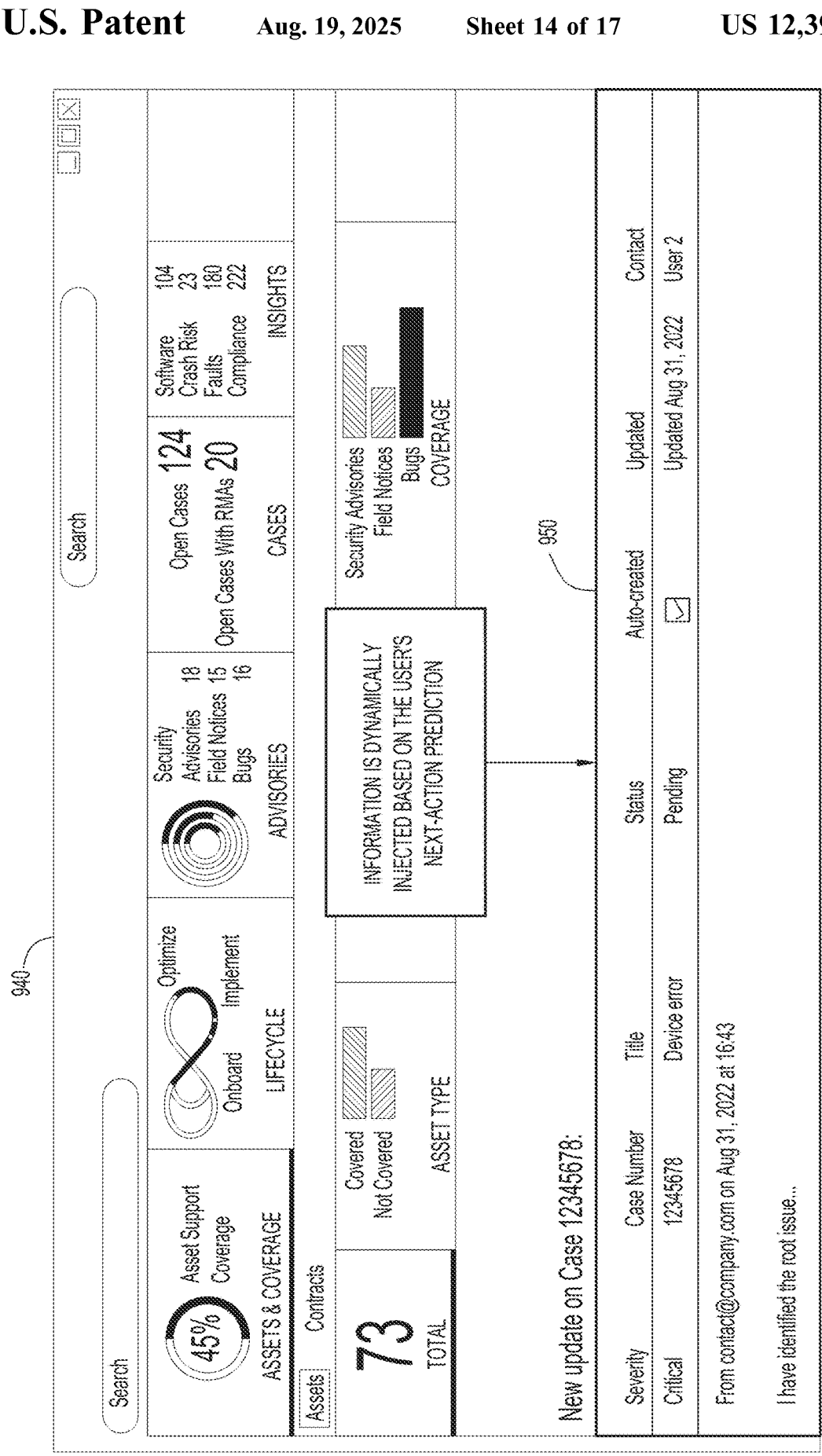
FIG. 9B illustrates customizing a user interface based on a mined activity pattern for the determined user persona, according to an example embodiment.

Referring now to FIG. 9B, a simulated screenshot illustrates how a user interface provided to a user may be adjusted based on previously mined patterns of user activity to facilitate a user objective associated with a dynamically determined persona. Based on the persona of the user and the mined pattern rules of previous user session with the same persona, the platform updates the user interface 940 with an element 950, which the user is predicted to use. By presenting the user with the element 950, the platform facilitates a user objective associated with the persona determined for the user in the current user session.

In one example, the user activity of the current user session may cause the platform to determine that the user is acting according to a support engineer persona. The platform dynamically modifies the user interface with an element 950 that displays information about an unresolved support case to facilitate the user objective of resolving technical support issue tickets. The platform directly presents the support case information on the user interface, saving the user the time navigating to the list of support cases and selecting one of the support cases to resolve.

In another example, the dynamic injection of the element 950 may improve the efficiency of users who are changing how they use the platform. For instance, if a user changes job functions, then the new job function may involve the user to access different aspects of the platform. By detecting the change in persona, the platform may present the user with different aspects of the platform that will help the user perform their new job functions. In some instances, a new user, or a user that changes how they use the platform, may not have been aware of other aspects of the platform. Automatically highlighting useful aspects of the platform allows the user to interact with the platform more efficiently. The platform may synthesize information from the historical user activity of other user sessions associated with a new persona for a user to find common inefficient paths or struggles for new users of a persona, and dynamically modify the user interface to allow the user to take a more efficient path.

In a further example, the dynamic injection of the element 950 is based on a dynamically determined user objective rather than typical pattern recognition. For instance, social media applications may predict what a user might like based on what they view or interact with, and then present similar content when additional content is requested (e.g., swiping to the next video, clicking the next button, etc.). In other words, if a user watches a video of a cat jumping at a flashlight, then a typical platform may present additional videos of cats, flashlights, jumping, or some combination of these ideas. Rather than simply present additional similar content, the platform operating according to the techniques described herein dynamically modifies aspects of the user interface to more easily allow the user to accomplish an objective. The platform may leverage redaptors to modify the user interface in real-time, i.e., without a refresh or page load.

Figure 10:
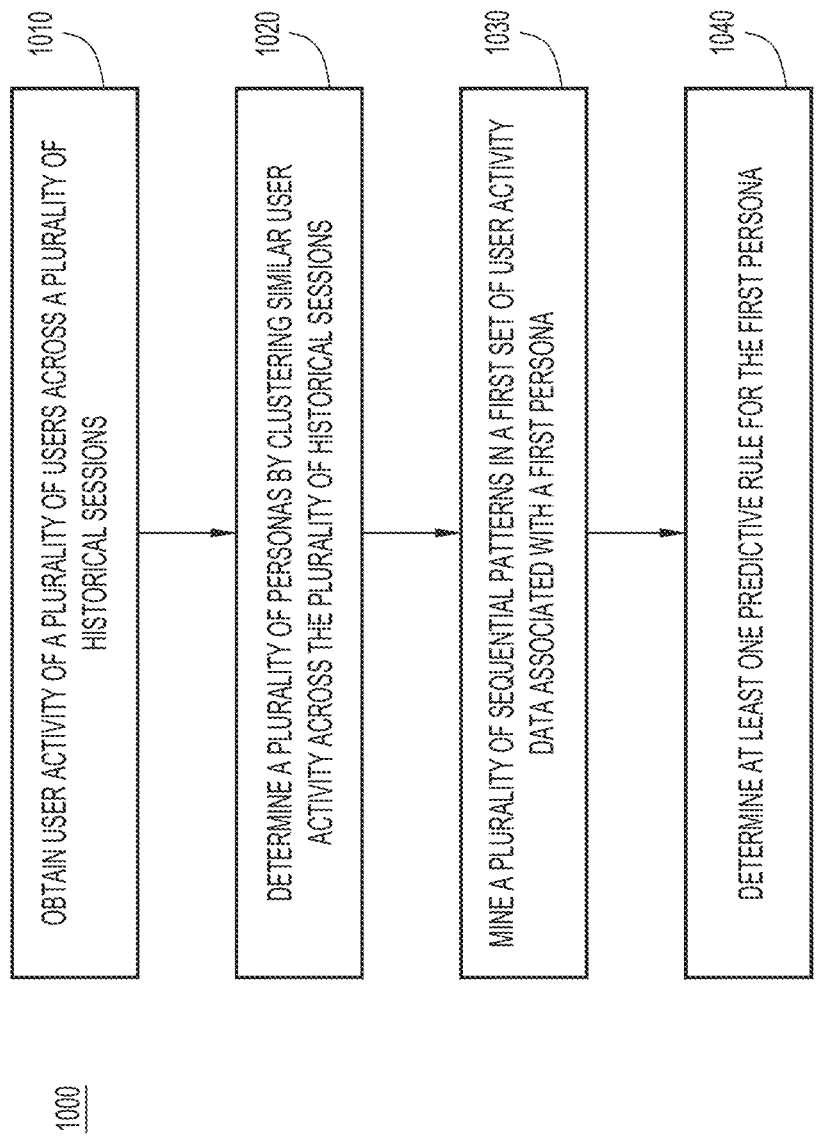
FIG. 10 is a flowchart illustrating operations performed by an application platform to process user activity from historical user sessions to determine user personas and rules for sequential patterns, according to an example embodiment.

Referring now to FIG. 10, a flowchart illustrates an example, process 1000 performed by a platform (e.g., application server 110) to analyze historical user activity to generate records of personas and mine sequences of user activity for each persona. At 1010, the platform obtains the user activity of a plurality of users across a plurality of historical sessions. In one example, the historical sessions may include sessions from a plurality of users across a plurality of organizations. In another example, the user activity may include clickstream data of users interacting with a cloud-based platform.

At 1020, the platform determines a plurality of personas by clustering similar user activity across the plurality of historical sessions. In one example, the user activity may be clustered using a k-means algorithm. The number of clusters/personas (e.g., the number k) may be predetermined based on domain knowledge of use cases for the platform. In other words, the platform operators may determine that there are five predominant use cases (e.g., developer, operator, manager, customer, and debugger) for their platform and set the number of clusters to be five based on their domain knowledge.

At 1030, the platform mines a plurality of sequential patterns in a first set of user activity data associated with a first persona among the plurality of personas. In one example, mining the plurality of sequential patterns may include the platform reading a database of sequential events as an input and producing the most common patterns as an output. The pattern mining algorithm may be run individually on sets of user activity associated with each of the personas determined at 1020 to mine sequential patterns associated with each of the personas.

At 1040, the platform determines at least one predictive rule associated with the first persona. Each predictive rule comprises an initial activity among the first set of user activity and at least one subsequent activity in the first set of user activity. In one example, the platform may determine the predictive rules based on the plurality of sequential patterns mined from the first set of user activity data that matches a set of parameters. The parameters may include a level of support, a level of confidence, and/or a window size between the initial activity and the subsequent activity.

Figure 11:
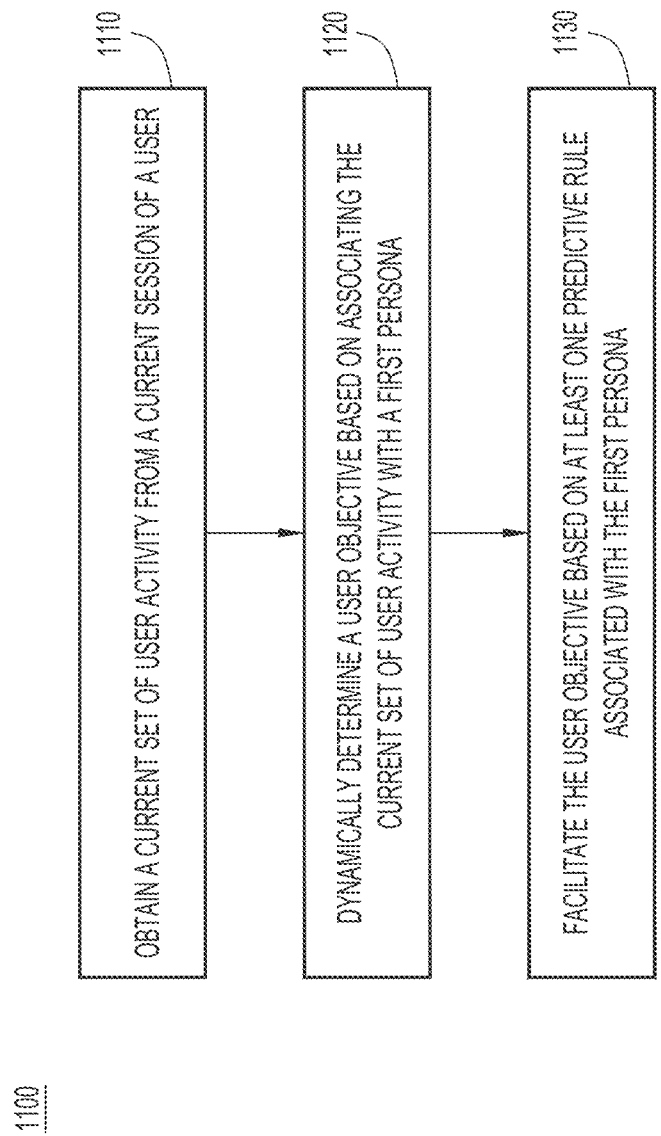
FIG. 11 is a flowchart illustrating operations performed by an application platform to provide a customized user interface based on current user activity, according to an example embodiment.

Referring now to FIG. 11, a flowchart illustrates an example process 1100 performed by a platform (e.g., application server 110) to improve on a user's experience interacting with the platform. At 1110, the platform obtains a current set of user activity of a current user session. In one example, the current set of user activity includes clickstream data for a user session as a user interacts with the platform. For instance, the currents et of user activity may include a record of which pages the user views and the elements with which the user interacts (e.g., clicks, enters text, or otherwise interacts).

At 1120, the platform dynamically determines a user objective based on associating the current set of user activity with a first persona. In one example, the platform may match attributes of the current set of user activity with attributes from historical sets of user activity that were associated with the first persona. The user objective may be associated with the first persona. For instance, the platform may determine that the current set of user activity is similar to the user activity of a support engineer persona with a user objective to resolve technical support cases. In another example, the platform may continuously or periodically monitor the current set of user activity as the user interacts further with the platform, and the platform may update the user objective in light of new user activity from the current set of user activity.

At 1130, the platform facilitates the user objective based on at least one predictive rule associated with the first persona. In one example, the platform may generate at least one predictive rule based on patterns of user activity mined from historical sets of user activity associated with the first persona. For instance, the platform may generate a rule that predicts that a user operating as the first persona will perform a second user activity (e.g., communicating with a customer that opened a support ticket) after performing a first user activity (e.g., selecting a customer support ticket). The platform may facilitate the second user activity based on a recognition of the first activity. For instance, the platform may prepare an email message and pre-populate certain customer information after a user with a support engineer persona selects a customer support ticket.

Figure 12:
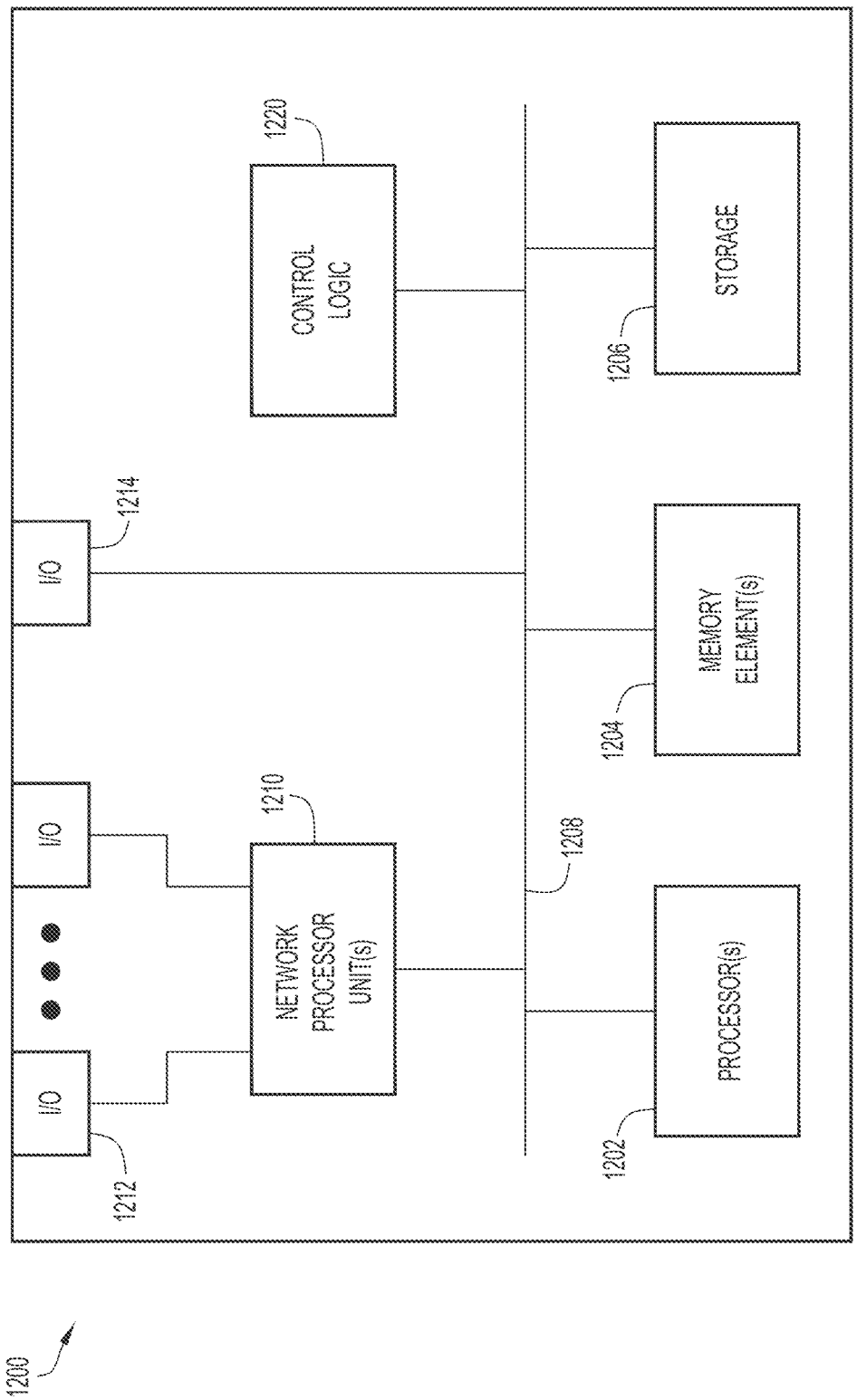
FIG. 12 is a block diagram of a computing device that may be configured to perform the techniques presented herein, according to an example embodiment.

Referring to FIG. 12, FIG. 12 illustrates a hardware block diagram of a computing device 1200 that may perform functions associated with operations discussed herein in connection with the techniques depicted in FIGS. 1, 2A, 2B, 3A-3C, 4, 5A, 5B, 6A-6C, 7, 8, 9A, 9B, 10, and 11. In various embodiments, a computing device, such as computing device 1200 or any combination of computing devices 1200, may be configured as any entity/entities as discussed for the techniques depicted in connection with FIGS. 1, 2A, 2B, 3A-3C, 4, 5A, 5B, 6A-6C, 7, 8, 9A, 9B, 10, and 11 in order to perform operations of the various techniques discussed herein.

In at least one embodiment, the computing device 1200 may include one or more processor(s) 1202, one or more memory element(s) 1204, storage 1206, a bus 1208, one or more network processor unit(s) 1210 interconnected with one or more network input/output (I/O) interface(s) 1212, one or more I/O interface(s) 1214, and control logic 1220. In various embodiments, instructions associated with logic for computing device 1200 can overlap in any manner and are not limited to the specific allocation of instructions and/or operations described herein.

In at least one embodiment, processor(s) 1202 is/are at least one hardware processor configured to execute various tasks, operations and/or functions for computing device 1200 as described herein according to software and/or instructions configured for computing device 1200. Processor(s) 1202 (e.g., a hardware processor) can execute any type of instructions associated with data to achieve the operations detailed herein. In one example, processor(s) 1202 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 1204 and/or storage 1206 is/are configured to store data, information, software, and/or instructions associated with computing device 1200, and/or logic configured for memory element(s) 1204 and/or storage 1206. For example, any logic described herein (e.g., control logic 1220) can, in various embodiments, be stored for computing device 1200 using any combination of memory element(s) 1204 and/or storage 1206. Note that in some embodiments, storage 1206 can be consolidated with memory element(s) 1204 (or vice versa), or can overlap/exist in any other suitable manner.

In at least one embodiment, bus 1208 can be configured as an interface that enables one or more elements of computing device 1200 to communicate in order to exchange information and/or data. Bus 1208 can be implemented with any architecture designed for passing control, data and/or information between processors, memory elements/storage, peripheral devices, and/or any other hardware and/or software components that may be configured for computing device 1200. In at least one embodiment, bus 1208 may be implemented as a fast kernel-hosted interconnect, potentially using shared memory between processes (e.g., logic), which can enable efficient communication paths between the processes.

In various embodiments, network processor unit(s) 1210 may enable communication between computing device 1200 and other systems, entities, etc., via network I/O interface(s) 1212 (wired and/or wireless) to facilitate operations discussed for various embodiments described herein. In various embodiments, network processor unit(s) 1210 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 1200 and other systems, entities, etc. to facilitate operations for various embodiments described herein. In various embodiments, network I/O interface(s) 1212 can be configured as one or more Ethernet port(s), Fibre Channel ports, any other I/O port(s), and/or antenna(s)/antenna array(s) now known or hereafter developed. Thus, the network processor unit(s) 1210 and/or network I/O interface(s) 1212 may include suitable interfaces for receiving, transmitting, and/or otherwise communicating data and/or information in a network environment.

I/O interface(s) 1214 allow for input and output of data and/or information with other entities that may be connected to computing device 1200. For example, I/O interface(s) 1214 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1220 can include instructions that, when executed, cause processor(s) 1202 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1220) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1204 and/or storage 1206 can store data, software, code, instructions (e.g., processor instructions), logic, parameters, combinations thereof, and/or the like used for operations described herein. This includes memory element(s) 1204 and/or storage 1206 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In summary, the techniques presented herein provide for a dynamic, persona-based, pattern mining model, which dynamically detects a platform user's persona based on behavior changes of the user. Additionally, based on the detected persona, the platform predicts the next actions of the user in a current session and dynamically modifies the user interface to facilitate those actions.

In some aspects, the techniques described herein relate to a method including: obtaining user activity of a plurality of users across a plurality of historical sessions; determining a plurality of personas by clustering similar user activity across the plurality of historical sessions; mining a plurality of sequential patterns in a first set of user activity data associated with a first persona of the plurality of personas; and determining at least one predictive rule associated with the first persona, each predictive rule including an initial activity among the first set of user activity data and at least one subsequent activity in the first set of user activity data.

In some aspects, the techniques described herein relate to a method, further including: obtaining a current set of user activity data from a current session of a user among the plurality of users; dynamically determining a user objective for the user based on associating the current set of user activity data with the first persona; and facilitating the user objective based on the at least one predictive rule associated with the first persona.

In some aspects, the techniques described herein relate to a method, wherein facilitating the user objective including adjusting a user interface of a user device to facilitate the at least one subsequent activity of the at least one predictive rule after detecting the initial activity.

In some aspects, the techniques described herein relate to a method, wherein dynamically determining the user objective for the user including associating the current set of user activity data with a second persona, wherein the second persona is associated with one or more different predictive rules.

In some aspects, the techniques described herein relate to a method, further including tracking which persona among the plurality of personas is associated with a particular user among the plurality of users for each historical session among the plurality of historical sessions that are associated with the particular user.

In some aspects, the techniques described herein relate to a method, wherein determining the plurality of personas by clustering similar user activity across the plurality of historical sessions includes: selecting a number k of personas in the plurality of personas based on a predetermined number of expected personas; and clustering the user activity across the plurality of historical sessions with a k-means clustering algorithm.

In some aspects, the techniques described herein relate to a method, wherein the at least one subsequent activity in the first set of user activity data is within a predetermined time window of the initial activity.

In some aspects, the techniques described herein relate to an apparatus including: a network interface configured to communicate with computing devices in a computer network; and a processor coupled to the network interface, the processor configured to: obtain via the network interface, user activity of a plurality of users across a plurality of historical sessions; determine a plurality of personas by clustering similar user activity across the plurality of historical sessions; mine a plurality of sequential patterns in a first set of user activity data associated with a first persona of the plurality of personas; and determine at least one predictive rule associated with the first persona, each predictive rule including an initial activity among the first set of user activity data and at least one subsequent activity in the first set of user activity data.

In some aspects, the techniques described herein relate to an apparatus, wherein the processor is further configured to:

obtain via the network interface, a current set of user activity data from a current session of a user among the plurality of users; dynamically determine a user objective for the user based on associating the current set of user activity data with the first persona; and facilitate the user objective based on the at least one predictive rule associated with the first persona.

In some aspects, the techniques described herein relate to an apparatus, wherein the processor is configured to facilitate the user objective by adjusting a user interface of a user device via the network interface to facilitate the at least one subsequent activity of the at least one predictive rule after detecting the initial activity.

In some aspects, the techniques described herein relate to an apparatus, wherein the processor is configured to dynamically determine the user objective for the user by associating the current set of user activity data with a second persona, wherein the second persona is associated with one or more different predictive rules.

In some aspects, the techniques described herein relate to an apparatus, wherein the processor is further configured to track which persona among the plurality of personas is associated with a particular user among the plurality of users for each historical session among the plurality of historical sessions that are associated with the particular user.

In some aspects, the techniques described herein relate to an apparatus, wherein the processor is configured to determine the plurality of personas by: selecting a number k of personas in the plurality of personas based on a predetermined number of expected personas; and clustering the user activity across the plurality of historical sessions with a k-means clustering algorithm.

In some aspects, the techniques described herein relate to an apparatus, wherein the at least one subsequent activity in the first set of user activity data is within a predetermined time window of the initial activity.

In some aspects, the techniques described herein relate to one or more non-transitory computer readable storage media encoded with software including computer executable instructions that, when the software is executed on a computing device, is operable to cause a processor of the computing device to: obtain user activity of a plurality of users across a plurality of historical sessions; determine a plurality of personas by clustering similar user activity across the plurality of historical sessions; mine a plurality of sequential patterns in a first set of user activity data associated with a first persona of the plurality of personas; and determine at least one predictive rule associated with the first persona, each predictive rule including an initial activity among the first set of user activity data and at least one subsequent activity in the first set of user activity data.

In some aspects, the techniques described herein relate to one or more non-transitory computer readable storage media, wherein the software is further operable to cause the processor to: obtain a current set of user activity data from a current session of a user among the plurality of users; dynamically determine a user objective for the user based on associating the current set of user activity data with the first persona; and facilitate the user objective based on the at least one predictive rule associated with the first persona.

In some aspects, the techniques described herein relate to one or more non-transitory computer readable storage media, wherein the software is further operable to cause the processor to facilitate the user objective by adjusting a user interface of a user device to facilitate the at least one subsequent activity of the at least one predictive rule after detecting the initial activity.

In some aspects, the techniques described herein relate to one or more non-transitory computer readable storage media, wherein the software is further operable to cause the processor to dynamically determine the user objective for the user by associating the current set of user activity data with a second persona, wherein the second persona is associated with one or more different predictive rules.

In some aspects, the techniques described herein relate to one or more non-transitory computer readable storage media, wherein the software is further operable to cause the processor to track which persona among the plurality of personas is associated with a particular user among the plurality of users for each historical session among the plurality of historical sessions that are associated with the particular user.

In some aspects, the techniques described herein relate to one or more non-transitory computer readable storage media, wherein the software is further operable to cause the processor to determine the plurality of personas by: selecting a number k of personas in the plurality of personas based on a predetermined number of expected personas; and clustering the user activity across the plurality of historical sessions with a k-means clustering algorithm.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
obtaining user activity of a plurality of users across a plurality of user sessions;
determining a plurality of personas by clustering similar user activity across the plurality of user sessions;
mining a plurality of sequential patterns in a first set of user activity data associated with a first persona of the plurality of personas;
obtaining a current set of user activity data from a current user session of a user among the plurality of users; and
dynamically updating a user interface of a user device of the user based on the first persona for the current user session.

2. The method of claim 1, further comprising:
determining at least one predictive rule associated with the first persona, the at least one predictive rule comprising an initial activity among the first set of user activity data and at least one subsequent activity in the first set of user activity data;
dynamically determining a user objective for the user based on associating the current set of user activity data with the first persona; and
facilitating the user objective based on the at least one predictive rule associated with the first persona.

3. The method of claim 2, wherein dynamically updating comprises adjusting the user interface of the user device for the user to facilitate the at least one subsequent activity of the at least one predictive rule after detecting the initial activity.

4. The method of claim 1, wherein dynamically updating comprises further adjusting the user interface of the user device of the user based on determining the current set of user activity data is associated with a second persona.

5. The method of claim 1, further comprising tracking which persona among the plurality of personas is associated with a particular user among the plurality of users for each user session among the plurality of user sessions that are associated with the particular user.

6. The method of claim 1, wherein determining the plurality of personas by clustering similar user activity across the plurality of user sessions comprises:
 selecting a number k of personas in the plurality of personas based on a predetermined number of expected personas; and
 clustering the user activity across the plurality of user sessions with a k-means clustering algorithm.

7. The method of claim 1, wherein at least one subsequent activity in the first set of user activity data is within a predetermined time window of initial activity among the first set of user activity data.

8. An apparatus comprising:
 a network interface configured to communicate with computing devices in a network; and
 a processor coupled to the network interface, the processor configured to perform operations including:
  obtaining, via the network interface, user activity of a plurality of users across a plurality of user sessions;
  determining a plurality of personas by clustering similar user activity across the plurality of user sessions;
  mining a plurality of sequential patterns in a first set of user activity data associated with a first persona of the plurality of personas;
  obtaining a current set of user activity data from a current user session of a user among the plurality of users; and
  dynamically updating a user interface of a user device of the user based on the first persona for the current user session.

9. The apparatus of claim 8, wherein the processor is further configured to perform operations including:
 determining at least one predictive rule associated with the first persona, the at least one predictive rule comprising an initial activity among the first set of user activity data and at least one subsequent activity in the first set of user activity data;
 dynamically determining a user objective for the user based on associating the current set of user activity data with the first persona; and
 facilitating the user objective based on the at least one predictive rule associated with the first persona.

10. The apparatus of claim 9, wherein the processor is configured to perform the dynamically updating by adjusting the user interface of the user device for the user to facilitate the at least one subsequent activity of the at least one predictive rule after detecting the initial activity.

11. The apparatus of claim 8, wherein the processor is configured to perform the dynamically updating by further adjusting the user interface of the user device of the user based on determining the current set of user activity data is associated with a second persona.

12. The apparatus of claim 8, wherein the processor is further configured to perform tracking which persona among the plurality of personas is associated with a particular user among the plurality of users for each user session among the plurality of user sessions that are associated with the particular user.

13. The apparatus of claim 8, wherein the processor is configured to perform determining the plurality of personas by:
 selecting a number k of personas in the plurality of personas based on a predetermined number of expected personas; and
 clustering the user activity across the plurality of user sessions with a k-means clustering algorithm.

14. The apparatus of claim 8, wherein at least one subsequent activity in the first set of user activity data is within a predetermined time window of initial activity among the first set of user activity data.

15. One or more non-transitory computer readable storage media encoded with software comprising computer executable instructions that, when the software is executed on a computing device, is operable to cause a processor of the computing device to perform operations including:
 obtaining user activity of a plurality of users across a plurality of user sessions;
 determining a plurality of personas by clustering similar user activity across the plurality of user sessions;
 mining a plurality of sequential patterns in a first set of user activity data associated with a first persona of the plurality of personas;
 obtaining a current set of user activity data from a current user session of a user among the plurality of users; and
 dynamically updating a user interface of a user device of the user based on the first persona for the current user session.

16. The one or more non-transitory computer readable storage media of claim 15, wherein the software is further operable to cause the processor to perform:
 determining at least one predictive rule associated with the first persona, the at least one predictive rule comprising an initial activity among the first set of user activity data and at least one subsequent activity in the first set of user activity data;
 dynamically determining a user objective for the user based on associating the current set of user activity data with the first persona; and
 facilitating the user objective based on the at least one predictive rule associated with the first persona.

17. The one or more non-transitory computer readable storage media of claim 16, wherein the software is further operable to cause the processor to perform the dynamically updating by adjusting the user interface of the user device for the user to facilitate the at least one subsequent activity of the at least one predictive rule after detecting the initial activity.

18. The one or more non-transitory computer readable storage media of claim 15, wherein the software is further operable to cause the processor to perform the dynamically updating comprises by adjusting the user interface of the user device of the user based on determining the current set of user activity data is associated with a second persona.

19. The one or more non-transitory computer readable storage media of claim 15, wherein the software is further operable to cause the processor to perform tracking which persona among the plurality of personas is associated with a particular user among the plurality of users for each user session among the plurality of user sessions that are associated with the particular user.

20. The one or more non-transitory computer readable storage media of claim 15, wherein the software is further operable to cause the processor to perform determining the plurality of personas by clustering similar user activity across the plurality of user sessions including:
- selecting a number k of personas in the plurality of personas based on a predetermined number of expected personas; and
- clustering the user activity across the plurality of user sessions with a k-means clustering algorithm.

* * * * *